United States Patent [19]

Arai et al.

[11] Patent Number: 5,436,639
[45] Date of Patent: Jul. 25, 1995

[54] INFORMATION PROCESSING SYSTEM

[75] Inventors: Toshifumi Arai, Hitachi; Hiroshi Shojima, Hitachiota; Soshiro Kuzunuki, Katsuta; Masaki Miura, Hitachi; Toshimi Yokota, Hitachiota; Keiko Gunji, Mito; Kazuo Aisaka, Tokyo; Tooru Numata, Chigasaki; Hideki Sakao, Yokohama; Yasushi Fukunaga, Hitachi, all of Japan

[73] Assignee: Hitachi, Ltd., Tokyo, Japan

[21] Appl. No.: 213,030

[22] Filed: Mar. 15, 1994

[30] Foreign Application Priority Data

Mar. 16, 1993 [JP] Japan ................... 5-056099
Sep. 10, 1993 [JP] Japan ................... 5-225949

[51] Int. Cl.⁶ .............................. G09G 5/08
[52] U.S. Cl. ....................... 345/156; 345/175
[58] Field of Search .................. 345/1, 113–115, 345/156–158, 173–178

[56] References Cited

U.S. PATENT DOCUMENTS 4,827,410  5/1989  Corren ..................... 345/173
5,300,943  4/1994  Jakobs et al. .............. 345/173

OTHER PUBLICATIONS

"A Digital Desk Calculator: Tangible Manipulation on a Desk Top Display", pp. 27–33, UIPT'91, Nov. 11–13, 1991, P. Wellner.

Primary Examiner—Jeffery Brier
Attorney, Agent, or Firm—Antonelli, Terry, Stout & Kraus

[57] ABSTRACT

An information processing system which comprises an integral input and display unit comprising a display which enables an object to be selectively displayed at one of a plurality of positions in a display area and a tablet having an input face overlaid on a display face of the display, the input and display face being disposed substantially horizontally, and a display whose display face is disposed substantially uprightly, wherein when an object is presented to a user in the display area of the display, a display position of the object is determined in response to at least one of a state of the user, a state of the input and display face, and a display state of the display, thereby enabling the object to be displayed at an easy-to-use position relative to the user's position.

19 Claims, 23 Drawing Sheets

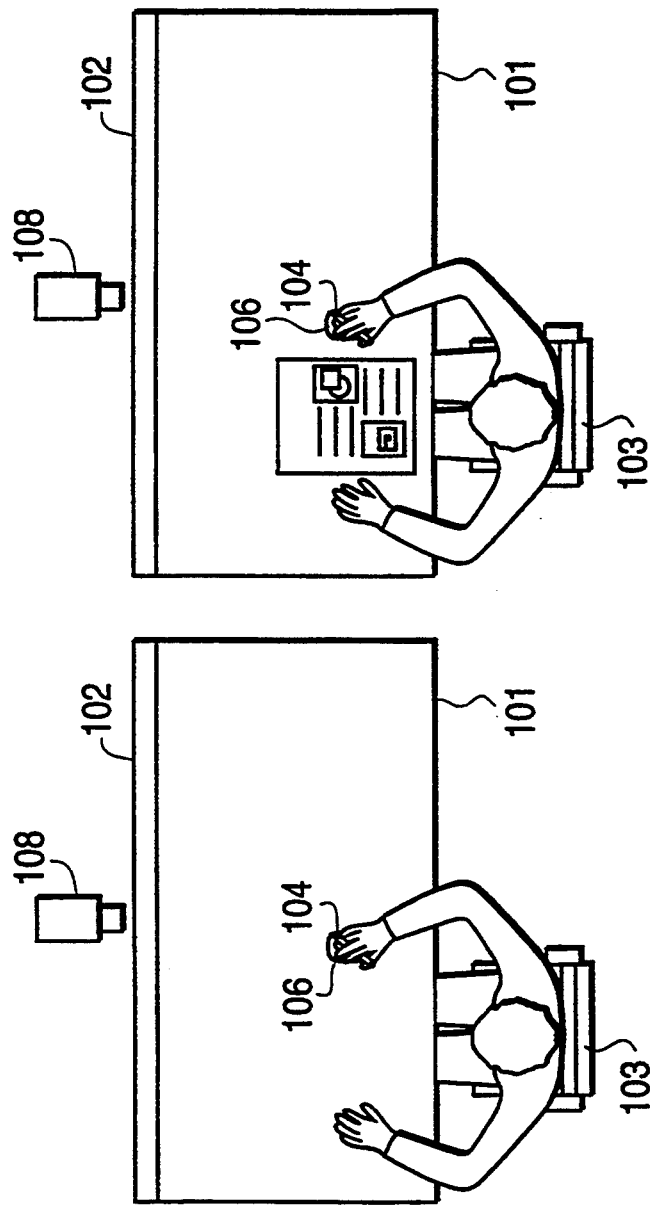

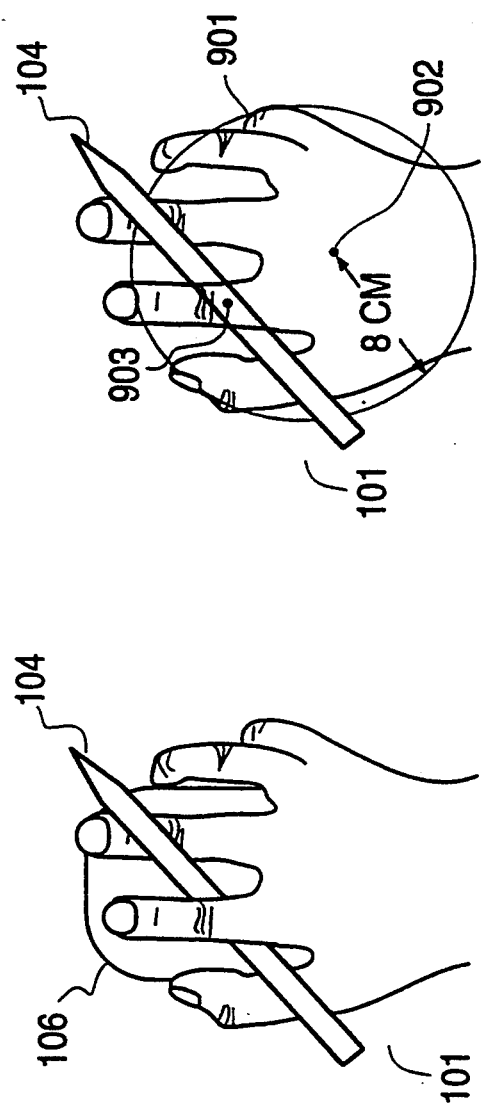

FIG.10

| | 1531 |
|---|---|
| CONDITION OF RIGHT HAND OF USER | CONDITION (N/C/P) |
| CONDITION OF LEFT HAND OF USER | CONDITION (N/C/P) |
| COORDINATES OF RIGHT HAND OF USER | COORDINATES (INTEGER, INTEGER) |
| COORDINATES OF LEFT HAND OF USER | COORDINATES (INTEGER, INTEGER) |
| COORDINATES OF PEN 104 | COORDINATES (INTEGER, INTEGER) |
| COORDINATES OF KEYBOARD 105 | COORDINATES (INTEGER, INTEGER) |
| COORDINATES OF MOUSE 106 | COORDINATES (INTEGER, INTEGER) |
| DOES USER USE PEN ? | YES/NO |
| DOES USER USE KEYBOARD ? | YES/NO |
| NUMBER OF OBSTACLES ON DESK | COUNT (INTEGER) |
| AREA OCCUPIED BY OBSTACLES ON DESK | SET OF RECTANGULAR AREAS |

FIG.11

| | 1541 |
|---|---|
| IS USER PRESENT ? | YES/NO |
| POSITION OF USER'S HEAD | PERCENTAGE FROM LEFT OF DESK (INTEGER) |
| DIRECTION OF USER'S FACE | DEGREES AT WHICH FACE IN LINES TO RIGHT, WHEN VIEWED FROM FRONT (INTEGER) |

FIG.13

| CONDITION | PENALTY IMPOSED WHEN CONDITION IS NOT SATISFIED |
|---|---|
| A. FIT TO USER POSITION | 5 |
| B. AVOID OBSTACLES ON DESK | 10 |
| C. PREVENT DISPLAY OVERLAPPING | 3 |

| COMBINATION OF CONDITIONS | TOTAL PENALTY |
|---|---|
| A,B,C | 0 |
| A,B | 3 |
| B,C | 5 |
| C,A | 10 |
| A | 13 |
| B | 8 |
| C | 15 |
| NO CONDITIONS SATISFIED | 18 |

140-1　130　140-2

140-1　130-1　130-2　140-2

INFORMATION PROCESSING SYSTEM

BACKGROUND OF THE INVENTION

This invention relates to a user interface for improving operability of an information processing system and in particular to a user interface for improving operability of an information processing system having an integral input and display unit of a large screen or having a plurality of displays.

A system described in the paper "The Digital Desk Calculator: Tangible Manipulation on a Desk Top Display," Proceedings of UIST'91, ACM, 1991 by Pierre Wellner is taken as a conventional example of an information processing system using the full surface of a desk as a display area and an input area. The system comprises a computer-controlled camera and projector above a desk. The projector is used for display and the camera for input. The system provides a "digital desk" having the functions of reading a paper document on the desk by the camera, for conversion to an electronic document and displaying it on the desk by the projector or printing the electronic document by a printer for conversion to a paper document, for example. Also disclosed is a user interface on which a position or articles on the desk is pointed to by a user's finger on the desk. Further, the paper suggests that actual stationeries such as an eraser can be used for performing processing related thereto.

However, in the related art such as the digital desk, the user interface does not care to make full use of an integral input and display unit (or a digitizing tablet overlaying a display screen) of a large screen or a plurality of displays.

That is, the related art teaches the idea that motion of a user's hand or an actual stationery is detected for use as a user interface, but fails to disclose an idea that the display position of the object to be displayed, which will be hereinafter referred to as the object, is determined by the user position or that the display position is determined avoiding places hidden by obstacles on the desk. This means that little or no consideration is given to possible problems which will occur when the integral input and display unit is enlarged to the size of the entire desk.

For example, the problems of the integral input and display unit of a large screen are as follows: If a display 40 inches wide, namely, about 1 m diagonal, is positioned with its screen face placed horizontally just in front of a user, unlike a conventional CRT display viewed by the user at a distance therefrom, it is difficult for the user to see the displayed object depending on the positional relationship between the object display position and the position where the user sits, or there is a chance that it will be difficult for the user to perform input operations at a position on the large screen, distant from the user.

Since such a large integral input and display unit occupies the major part of the desk, it is possible that the user uses the top surface of the integral input and display unit as a work space. For example, the user may work with reference materials such as books and notes placed on the integral input and display unit. Therefore, there is a chance that the obstacles will conceal the displayed object.

Thus, in the related art, if an object is presented at a position distant from the user at the large-screen integral input and display unit placed horizontally, the user must take steps such as moving his or her body conforming to the object display position or moving the object to a position where it is visible. Load is therefore placed on the user.

The related art provides techniques whereby the displayed object can be moved by hand as if it actually existed, etc., and lessens the awareness that the user is handling a computer, but the operations supported by the art are limited.

SUMMARY OF THE INVENTION

According to the invention, there is first provided an information processing system, comprising an integral input and display unit comprising a display which enables an object to be selectively displayed at one of a plurality of positions in a display area and a tablet having an input face overlaid on a display face of the display, the input and display face being disposed substantially horizontally, and a display position determination section, when an object is to be presented to the user in the display area of the display, for determining the display position of the object in response to at least one of a state of the user, a state of any article placed on the input and display face, and a display state of the display.

The display position determination section determines the display position of a new object so as to fit to the user position in response to the user position, to avoid the position of an article placed on the input and display face, or to avoid the display position on which an object has already been displayed.

In a case where the information processing system is provided with an additional display device whose display screen is upright with respect to the integral input and display unit, whether the object is to be displayed on the integral input and display unit or on the additional display device is automatically determined, based on whether or not the user picks up a pen of the tablet or whether or not a keyboard is placed in front of the user.

According to the information processing system of the invention, when an object (information) is presented to the user on the substantially horizontal input and display face, the presentation position of the object (information) is determined automatically in response to at least one of a state of the user, a state of any article placed on the input and display face, and a display state of the display. If the upright display face is included in addition to the horizontal input and display face, the user's pickling up a pen of the tablet or attempting to operate the keyboard is detected and the horizontal or upright display face is selected automatically for display of the object in response to the detection result.

Thus, according to the information processing system of the invention, the object can be presented to the user at an easy-to-use position from the user position in response to the user state, etc. This eliminates the need for the user to specify the display position each time, providing an operable information processing system.

According to the invention, there is second provided an information processing system comprising a display, a camera for taking a picture on a display face of the display, and a processor connected to the display and the camera. The processor recognizes a hand of an operator and the position and motion of the hand contained in the picture taken by the camera, is responsive to the recognized hand position for determining whether or not the operator hand is placed on the display position of the document on the display face of the display, and if the operator hand is placed on the display position of the document, is responsive to the recognized hand and hand position for determining whether the operator places one hand or both hands on the display position of the document, and is responsive to motion of the operator hand subsequently recognized and a determination as to whether the operator places one hand or both hands on the display position of the document for performing different operation on the display of the document on which the hand or hands are placed.

Considering a human being handling a document written on actual paper, generally he or she performs operations by one hand or both hands and usually performs different operations through different hand motion. Thus, according to the invention, the information processing system can be responsive to a determination as to whether the operator places one hand or both hands on the displayed document and hand motion of the operator for selecting the operation to be performed on the displayed document so as to fit to the human being handling the document written on actual paper and therefore can provide a man-machine interface furthermore matching the human feeling and enabling diversified types of operation.

BRIEF DESCRIPTION OF THE DRAWINGS

In the accompanying drawings:

FIGS. 6A and 6B are illustrations showing an example of object display considering the user position in the embodiment;

FIGS. 9A and 9B are illustrations showing a case where a user takes a pen in hand in the embodiment;

FIG. 10 is an illustration of information stored in a desk top monitor in the embodiment;

FIG. 11 is an illustration of information stored in a user monitor in the embodiment;

FIG. 13 is a table showing an example of automatic allocation definition data in the embodiment;

FIG. 14 is a table showing an example of penalty calculation for combinations of conditions in the embodiment;

DETAILED DESCRIPTION OF THE PREFERRED EMBODIMENTS

Referring now to the accompanying drawings, there are shown preferred embodiments of the invention.

Figure 1:
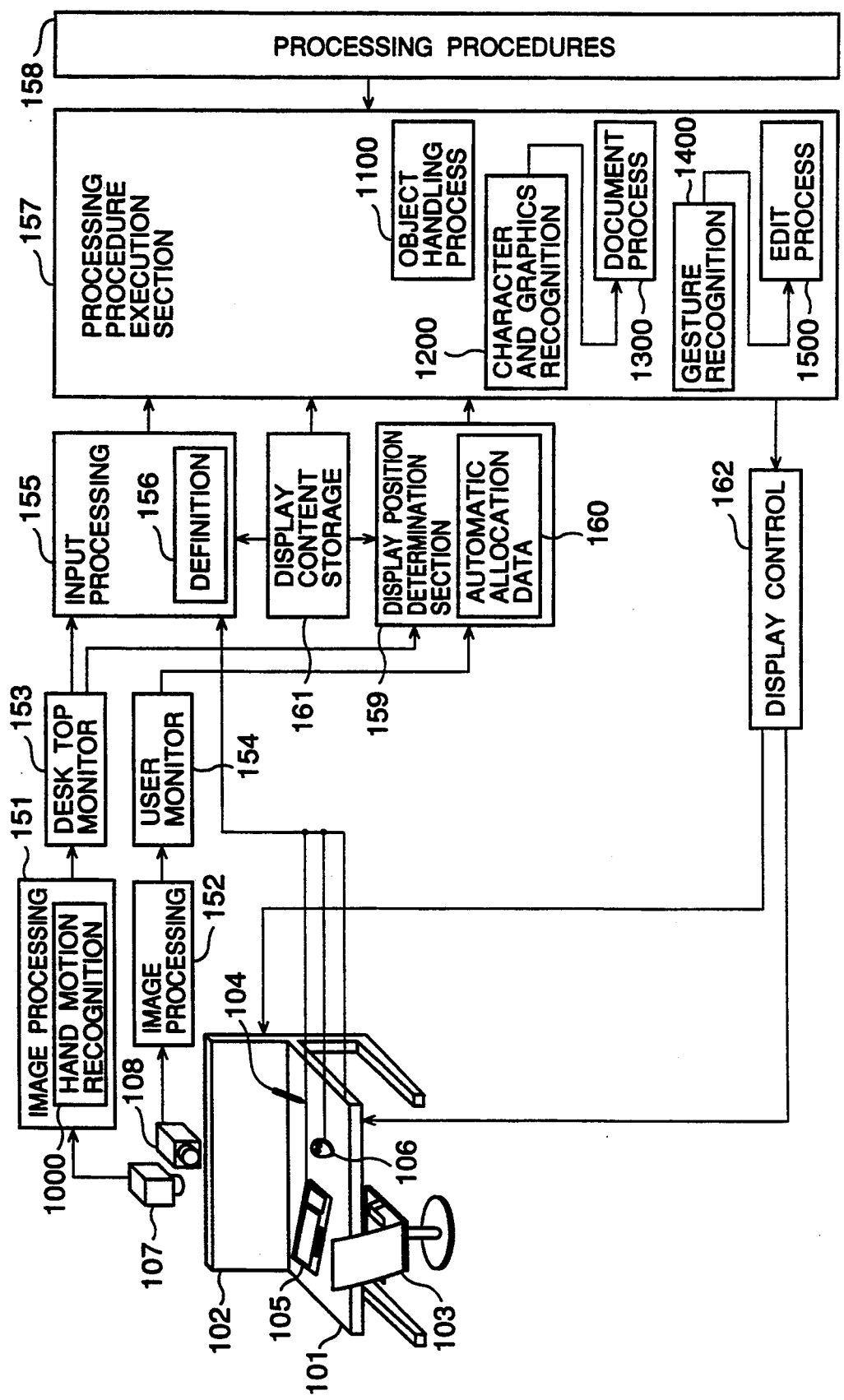
FIG. 1 is an illustration showing an outline and functions of an information processing system according to one embodiment of the invention.

FIG. 1 is a functional block diagram of an information processing system according to one embodiment of the invention. A display section consists of a combination of a desk 101 and a partition 102. The user sits on a chair in order to operate the information processing system. The user can use a pen 104, a keyboard 105, and a mouse 106 to input or handle information.

Figure 2:
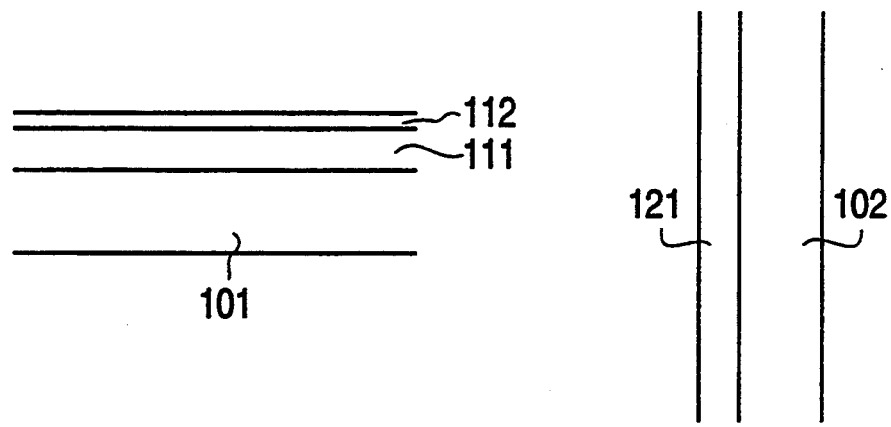
FIG. 2 is sectional views of the top of a desk 101 and the upper section of a partition 102 in FIG. 1.
Figure 3:
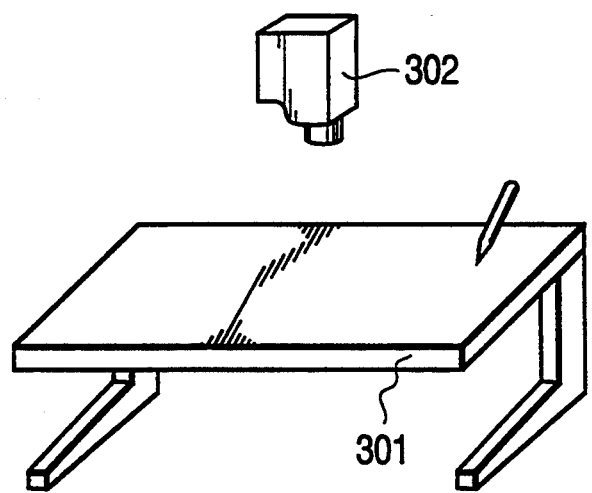
FIG. 3 is a general view of an integral input and display unit of a large screen according to another embodiment of the invention using a projection display.

To form the display section 101, 102, flat displays and a transparent tablet are used in combination, as shown in sectional views thereof in FIG. 2. That is, a flat display 111 is disposed on the top of the desk 101 with almost all the area of the desk 101 being used as a display area and a transparent tablet 112 is mounted on the surface of the flat display 111. The transparent tablet 112 reads coordinates of the pen 104 (FIG. 1). A flat display 121 is embedded in the surface of the upright partition 102. A large screen CRT can also be used in place of the flat display 121. A projection display may also be used for projection on the desk, as shown in FIG. 3. An output of the information processing system is displayed on a desk 301 by a video projector, in which case the desk 301 contains a tablet for inputting pen coordinates, but not a display. Although an image is projected from above the desk in FIG. 3, it may be projected from the rear of the desk 301 with the surface of the desk 301 as a screen (described below in conjunction with FIG. 4). The display section 101 will be hereinafter referred to as the flat display section and the display section 102 as the upright display section.

Referring again to FIG. 1, a camera 107 is located above the flat display section 101 for monitoring the conditions on the desk. A picture from the camera 107 is input to an image processing section 151, which detects the positions of articles placed on the desk from the picture of the desk top and performs recognition processing 1000 of a hand motion of the user. The recognition result is sent to a desk top monitor section 153. Particularly, the hand motion recognition process 1000 and an object handling process 1100 of a processing procedure execution section 157 are executed in direct conjunction with each other (described below). When detecting the user executing some processing for the information processing system, the desk top monitor section 153 reports information to an input processing section 155. For example, when detecting the user giving some instruction to the information processing system with his or her finger, the desk top monitor section 153 sends information concerning it to the input processing section 155. Also, the desk top monitor section 153 always stores the positions of the articles placed on the desk and can respond to an inquiry from any other functional block with information reporting the conditions on the desk.

The information stored in the desk top monitor section 153 is as a table as shown in FIG. 10, for example. The entries under the left column of the table 1531 denote the meanings of information stored and how the conditions (or values) of the information are stored is indicated under the right column. In the embodiment, included as the information are "condition of right hand of user," "condition of left hand of user," "coordinates of right hand of user," "coordinates of left hand of user," "coordinates of pen 104," "coordinates of keyboard 105," "coordinates of mouse 106," "does user use pen?," "does user use keyboard?," "number of obstacles on desk,"and "area occupied by obstacles on desk."

The conditions of user's hands are classified into three categories, such as not on desk (N), pointing to something (P), and otherwise (C), for storage. The coordinates are stored as two integers indicating the coordinates of a display system on the display section 101. The information as to whether or not the user uses the pen (keyboard) is stored as the condition YES or NO. The number of obstacles on the desk is stored as an integer value indicating the count. The area occupied by obstacles on the desk is stored as a set of rectangular areas containing the obstacles.

The information and how to store the conditions listed in FIG. 10 are simply shown for example, and the invention is not limited to them.

A camera 108 is located above the upright display section 102 for monitoring the conditions of the user. A picture from the camera 108 is input to an image processing section 152, which detects the position and direction of the user from the picture of the user and sends the result to a user monitor section 154. The user monitor section 154 always stores the conditions of the user and can respond to an inquiry from any other functional block with information reporting the conditions of the user.

FIG. 11 shows a table of information stored in the user monitor section 154. The table 1541, like the table 1531 in FIG. 10, stores information entries under the left column and the conditions under the right column. In the embodiment, stored as the information are "is user present?," "position of user's head,"and "direction of user's face." The information as to whether or not the user is present is stored as the condition YES or NO. The position of the user's head is stored as a percentage of the position at which the head is placed in from left with respect to the desk width. The direction of the user's face is stored as the number of degrees the face inclines to right when viewed from the front.

The input processing section 155 receives inputs of the user, namely, signals from the keyboard 105, the mouse 106, and the tablet 112, and inputs from the desk top monitor section 153, and determines the processing procedure to be executed in response to the inputs. When the processing procedure to be started is determined, information on the objects displayed on the screen, such as a document image, icon, table, or graph, is considered in addition to the type of input from the user and the position information. The information is stored in a display content storage section 161. When display specification information and coordinates are given, the display content storage section 161 can return information on the object displayed in the specified area. To provide information to find an empty area of display, the display content storage section 161 stores the, screen area occupied by the displayed object as a set of rectangular areas.

The processing procedure to be selected by the input processing section 155 in response to an input can be determined by the type of input and the attribute of the object displayed at the position where the input occurs. For example, assume that the user specifies one position on the display 111 with the pen 104. It is detected by the tablet 112 and reported to the input processing section 155, which then inquires of the display content storage section 161 what is displayed at the user-specified position on the display 111, and determines the processing procedure to be started based on the inquiry result and the fact that the user makes a specification with the pen 104. For example, if a page image of a document is displayed at the user-specified position, a processing procedure for editing the document is selected.

Figure 16:
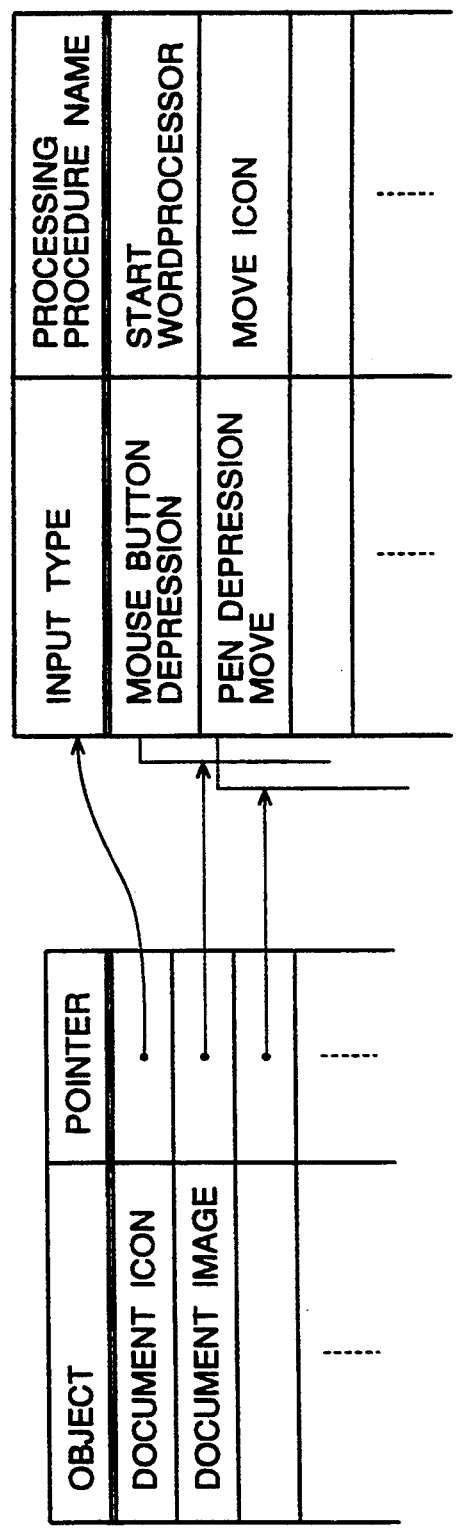
FIG. 16 is an illustration showing an example of input processing definition data in the embodiment.

Thus, the input processing section 155 references input processing definition data 156 to determine the processing procedure to be started from the attribute of object and the type of input. The input processing definition data 156 contains a table listing correspondence between the input types and the processing procedures to be started concerning all the types of objects that can be handled by the information processing system. That is the processing procedure to be executed based on the type of input instruction is defined for each object, as shown in FIG. 16. In the example in FIG. 16, if the user depresses a mouse button, such as with a double click for the object of a document icon, a wordprocessor is accordingly started. If the user depresses and moves the pen for the document icon, the icon is moved accordingly. Further, for the document image, the hand motion of the operator is recognized by the recognition section 1000 and the object handling process 1100 (described below) is executed. If the operator inputs coordinates through the tablet 112 for the document image, character and graphics recognition 1200 is executed and document processing 1300 is performed or the gesture is recognized and edit processing 1500 is performed.

The input processing section 155 informs the processing procedure execution section 157 of the determined processing procedure. The processing procedure execution section 157 reads the processing procedure specified by the input processing section 155 from the processing procedures 158 for execution.

The processing procedure execution section 157 performs some predetermined processing according to the contents of the processing procedure being executed. In the description to follow, it is assumed that it becomes necessary to present some object to the user during the processing.

The processing procedure execution section 157, which understands the contents of the object to be presented to the user, can calculate the object display size required when the object is displayed. The processing procedure execution section 157 transfers the size information of the object display area to a display position determination section 159 to determine the display position.

The display position determination section 159 requests necessary information from the desk top monitor section 153, the user monitor section 154, and the display content storage section 161, and determines the display position in response to the returned information. That is, a visible and easy-to-operate position in front of the user (when the object is displayed on the flat display 111, a location with no obstacles on the desk and with an empty area for displaying the object) is an ideal display position. If the desk top monitor section 153 reports that the user intends to use the keyboard 105, the object needs to be displayed on the upright display 121 rather than the flat display 111 to facilitate keyboard entry. If the desk top monitor section 153 reports that the user intends to use the pen 104, the object is displayed on the flat display 111 rather than the upright display 121 for convenient pen input. However, all conditions are not necessarily satisfied at the same time. Therefore, information to determine what condition takes precedence over other conditions is required. The priorities are provided as automatic allocation definition data 160. A specific example of the automatic allocation definition data 160 is given below.

The display position determination section 159 returns the determined display position to the processing procedure execution section 157, which then issues a drawing command for displaying the object to a display control section 162 according to the display position. In response to the received drawing command, the display control section 162 draws the object on the flat display 111 or the upright display 121. The processing procedure execution section 157 reports the displayed object to the display content storage section 161, which then updates the stored information in response to the report.

Figure 4:
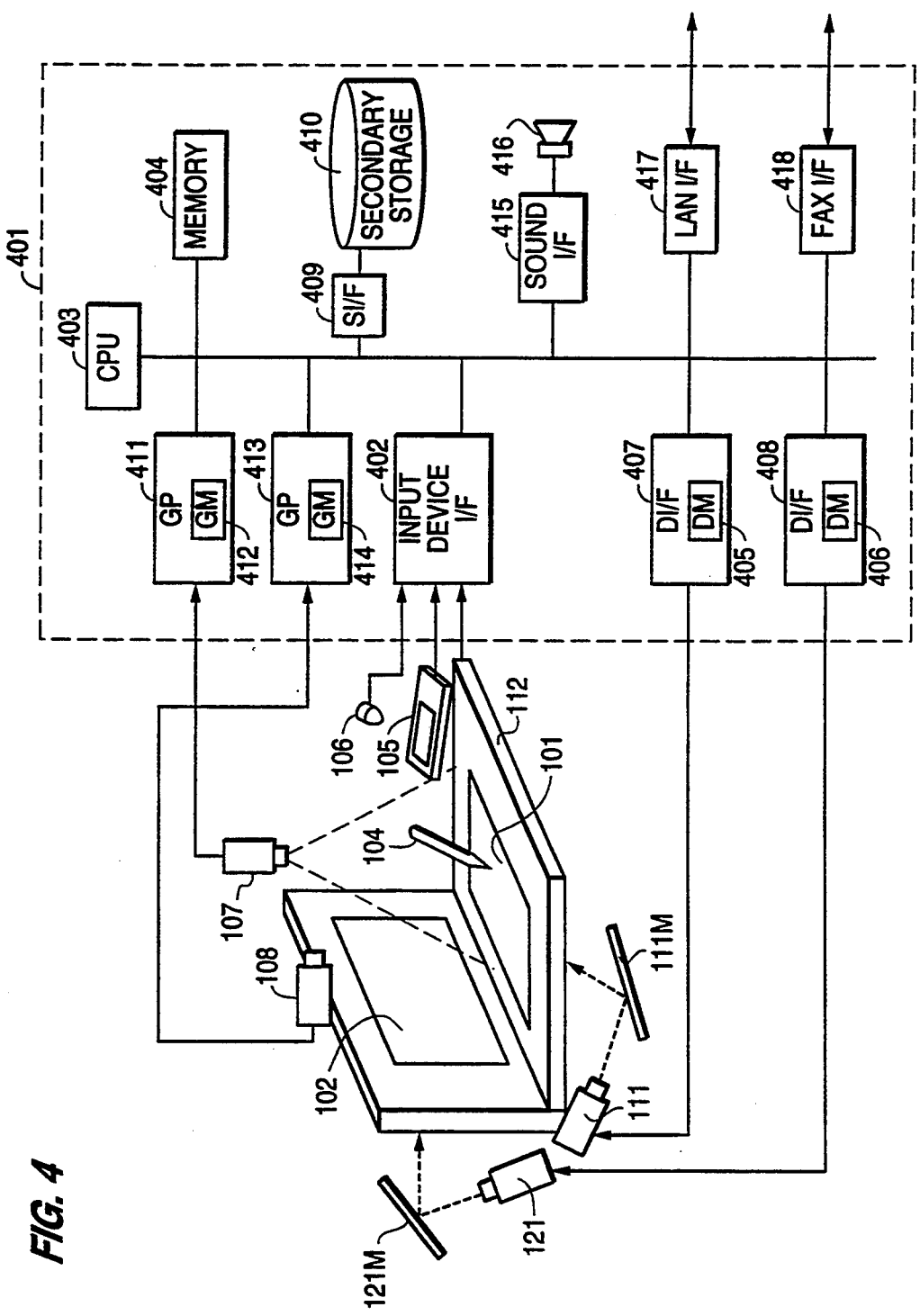
FIG. 4 is a hardware block diagram of the entire information processing system in FIG. 1.

FIG. 4 shows a hardware block diagram of the entire information processing system. A central information processor 401 comprises an input device interface 402, a CPU 403, a memory 404, display memories (DMs) 405 and 406, display interfaces (DI/Fs) 407 and 408, a secondary storage interface (SI/F) 409, a secondary storage 410, image processors (GPs) 411 and 413, image memories (GMs) 412 and 414, a sound interface 415, a loudspeaker 416, external communication interfaces LANI/F 417 and FAXI/F 418, etc. The image processor 411 is connected to the camera 107 and the image processor 413 to the camera 108. The displays of the display sections 101 and 102 are formed with the desk surface as a screen on which images are projected via mirrors 111M and 112M by projection displays 111 and 121 from the rear of the desk. Of course, the structures shown in FIGS. 2 and 3 may be used.

The desk top monitor section 153, the user monitor section 154, the input processing section 155, the processing procedure execution section 157, the display position determination section 159, the display content storage section 161, and a part of the display control section 162 are all provided as programs stored in the memory 404, which are executed by the CPU 403. The input processing definition data 156, the processing procedures 158, and the automatic allocation definition data 160 are stored in the memory 404 or the secondary storage 410, and referenced or updated by the programs.

The central information processor 401 reads signals via the input device interface 402 from the input devices, namely, the tablet 112, the keyboard 105, and the mouse 106. The CPU 403 processes inputs from the input devices in response to the program contents stored in the memory 404 and as a result, references or changes the contents of the memory 404 or the contents of the display memories 405 and 406 or references or updates the data stored in the secondary storage 410 via the secondary storage interface 409. The contents of the display memory 405 are output through the display interface 407 to the display 111. Likewise, the contents of the display memory 406 are output through the display interface 408 to the display 121.

The, image processing section 151 described in conjunction with FIG. 1 is provided by the image processor 411. The desk top state photographed by the camera 107 is input to the image processor 411 and is stored in the image memory 412. To recognize articles on the desk top, the display contents of the display 111 are preferably excluded from the image photographed by the camera 107, because a process of distinguishing the display contents from the articles on the desk top is otherwise required. The display contents of the display 111 can be excluded by temporarily clearing the display contents conforming to the timing at which the camera picks up an image. Since the image picking-up time is extremely short compared with the processing time of the taken-in image, the user does not feel a sense of incongruity even if the display during the picked-up image disappears. Since the timing at which the camera 107 picks up an image is controlled by the image processor 411, the process can be executed by the image processor 411 and the display interface 407 in synchronization with each other.

When the image of only the articles on the desk top is obtained, the image processor 411 detects a hand motion of the user, for example, as described in REAL-TIME DETECTION OF POINTING ACTION FOR A GROVE-FREE INTERFACE, M.FUKUMOTO ET.AL, MVA'92 IAPR Workshop on Machine Vision Applications, 1992, and recognizes the attributes and motion of articles on the desk top, for example, as described in Visual Pattern Recognition Technologies, pp 117–128, Trikeppus Corporation, 1983.

The image processing section 152 described in conjunction with FIG. 1 is provided by the image processor 413. As with the camera 107, the user state photographed by the camera 108 is input to the image processor 413 and is stored in the image memory 414. The image processor 413 recognizes the position, body direction, and motion of the user, for example, as described in Up-to-date Trend of Image Processing Algorithm, pp128–144, New Technical Communications Corporation, 1986. It can also estimate the position of the user by detecting a motion of the user's head as described in Head Reader: Real-time detection of Head Motion according to Image, DENSI JOHO TUSHIN GAKKAI RONBUNSI, D-II Vol.J74-D-II No.3 pp.398–406, 1991.

Figure 12:
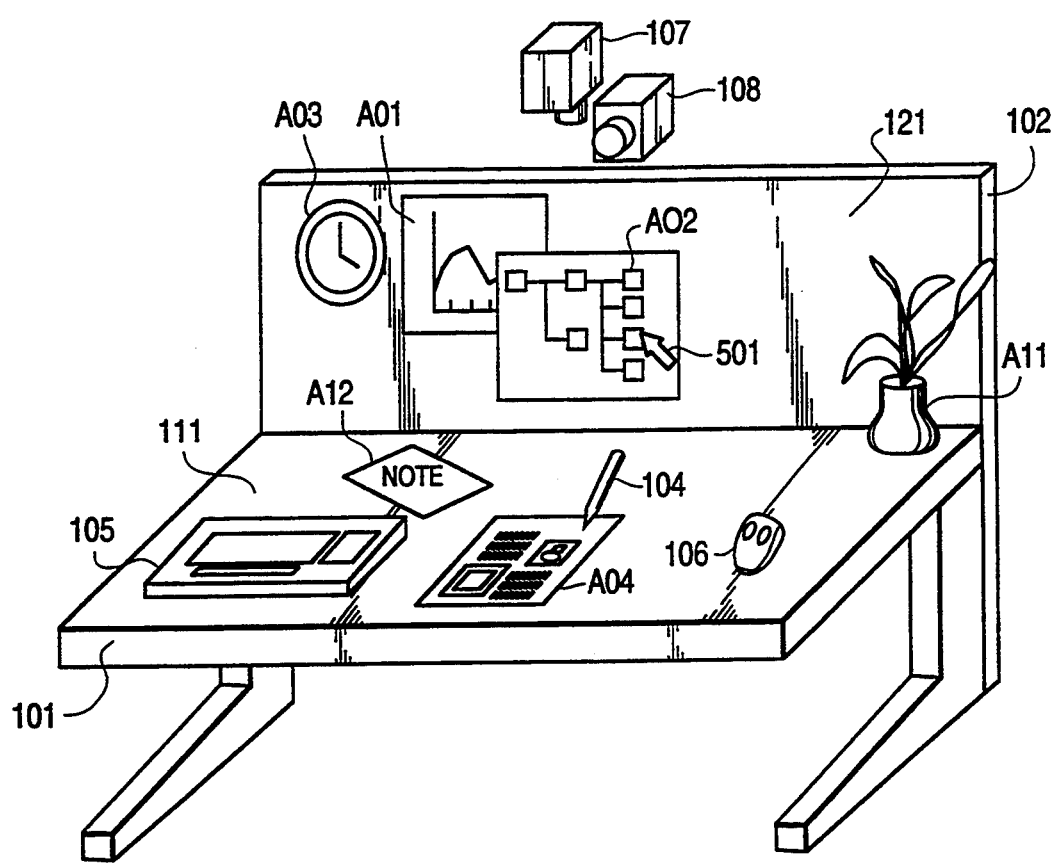
FIG. 12 is an illustration of a use example of the information processing system according to the embodiment.

FIG. 12 shows the state around the desk in an environment in which the information processing system according to the embodiment is used. For convenience, the user is not shown in the figure. A window A01 showing a graph, a window A02 showing a tree structure of file organization, and a clock A03 are displayed on the upright display 121. A document page image A04 is displayed on the flat display 111.

Placed on the desk 101, namely, the flat display 111 are a vase A11, a notebook A12, the pen 104, the keyboard 105, and the mouse 106 as actual objects. As well as using the large-screen integral input and display unit, the display also serves as a work space on the desk, which is an article of furniture. It must also be considered that various items as mentioned above are placed thereon.

Figure 5:
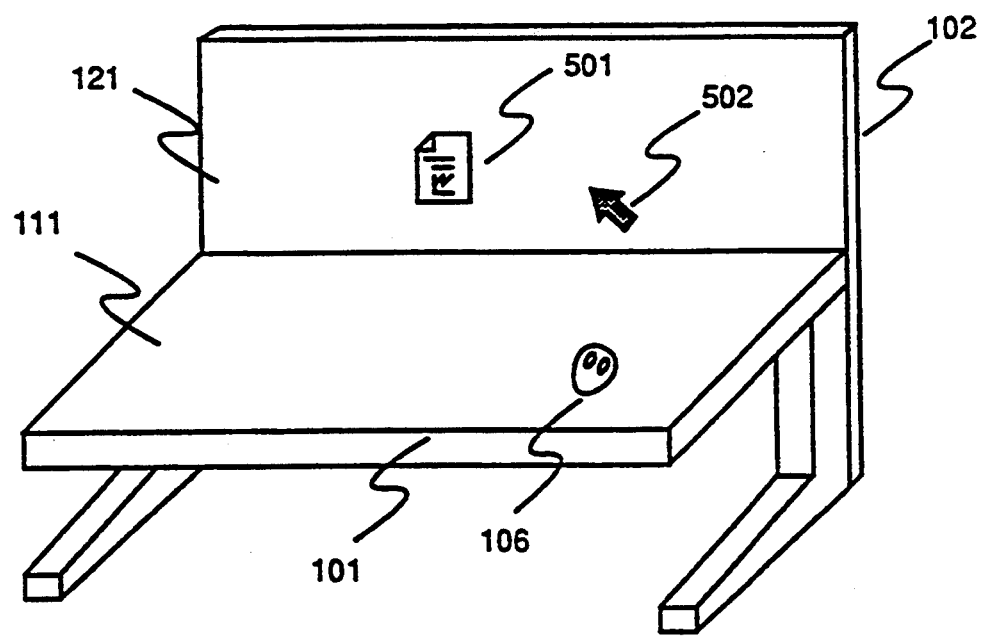
Fig. 5 is an illustration showing an example of operation for the user to open an electronic document in the embodiment.

FIG. 5 shows an example of operation for the user to open an electronic document stored in the secondary storage 410. In this case, assume that the document is displayed on the upright display 121, for example, as an icon 501. Assume that the user uses the mouse 106 placed on the desk 101 to move a pointer 502 displayed on the upright display 121 or the flat display 111 and that when the pointer 502 overlaps with the icon 501, the user can depress the button of the mouse 106 two successive times (double click) for converting the document into a page image to view the document contents. Assume that the pointer 502 is common to the flat and upright displays 111 and 121 and can move in response to a motion of the mouse without considering their boundaries.

The operation of the information processing system in the example is described with the operation of the functional blocks in FIG. 1. The input processing section 155, which can discern that the user has handled the button of the mouse 106 and discern the position of pointer 502 at the time, inquires of the display content storage section 161 what is displayed at the position of the pointer 502. The display content storage section 161 answers that the icon indicating a document file exists at the position. Then, the input processing section 155 references the input processing definition data 156, selects a processing procedure to open the document, and reports it to the processing procedure execution section 157, which then fetches the specified processing procedure from the processing procedures 158 and starts execution of the processing procedure. The document is displayed according to the contents of the selected processing procedure, by the processing procedure execution section 157.

The processing procedure execution section 157 uses the function of the display position determination section 159 to obtain the display position of the document. How the display position determination section 159 determines the display position is described below.

First, the display position determination section 159 determines to which of the flat display 111 and the upright display 121 the object is to be output. To do this, information as to whether or not the user uses the keyboard 105 can be used, for example. The information is stored in the desk top monitor section 153 as the table 1531 (FIG. 10), as described above. The display position determination section 159 inquires of the desk top monitor section 153 whether or not the user use the keyboard 105. If the user uses the keyboard 105, the display position determination section 159 decides that display of the object should be output to the upright display 121; otherwise, it decides that display of the object should be output to the flat display 111.

Upon determination of the display on which the object is to be displayed, the display position determination section 159 determines where the object is to be displayed in the display area of the display. A process flow for determining the display position is described below by taking display of the object on flat display 111 as an example.

Assume that three conditions "fit to user position," "avoid obstacles on desk," and "prevent display overlapping" are considered to determine the object display position in the embodiment. Information as to which of the conditions should take precedence over other conditions is stored in the automatic allocation definition data 160. FIG. 13 shows an example of the contents of the automatic allocation definition data 160.

The conditions and the penalty values imposed when the conditions are not satisfied are related to each other in a table 1601 of the automatic allocation definition data 160 shown in FIG. 13. In the example, the penalty value imposed when "A. fit to user position" is not satisfied is defined as 5, that when "B. avoid obstacles on desk" cannot be satisfied is defined as 10, and that when "C. prevent display overlapping" cannot be satisfied is defined as 3. The conditions and their corresponding penalty values are not limited to the example. The penalty values may be previously fixed, but preferably can be changed by the system or user.

FIG. 14 shows total penalty values imposed when only the condition A, B, or C or any combination thereof is satisfied. For example, when only conditions "A. fit to user position" and "B. avoid obstacles on desk" are satisfied, that is, when the condition "prevent display overlapping" is not satisfied (not decided), the penalty becomes 3 in total as seen from FIG. 13. Likewise, when only the condition "B. avoid obstacles on desk" is satisfied, that is, when conditions "A. fit to user position" and "C. prevent display overlapping" are not decided, the penalty becomes 8 in total.

The display position determination section 159 attempts to determine the display position starting at the combination corresponding to the smallest total penalty. That is, first the display position determination section 159 checks to see if the display position satisfying all conditions A, B, and C exists; if it exists, employs the display position; otherwise, checks to see if the display position satisfying conditions A and B exists; if it exists, employs the display position; otherwise, checks to see if the display position satisfying conditions B and C exists, and so forth on.

When the display position determination section 159 is given a combination of conditions to be attempted, it first finds regions that cannot be used to display the object from the given conditions, then checks to see if an area sufficient to display the object can be reserved so as not to overlap with any of the regions. If the area can be reserved, the display position determination section 159 uses the area as the display position of the object; otherwise, determines that the display position satisfying the given condition combination does not exist.

Figure 15:
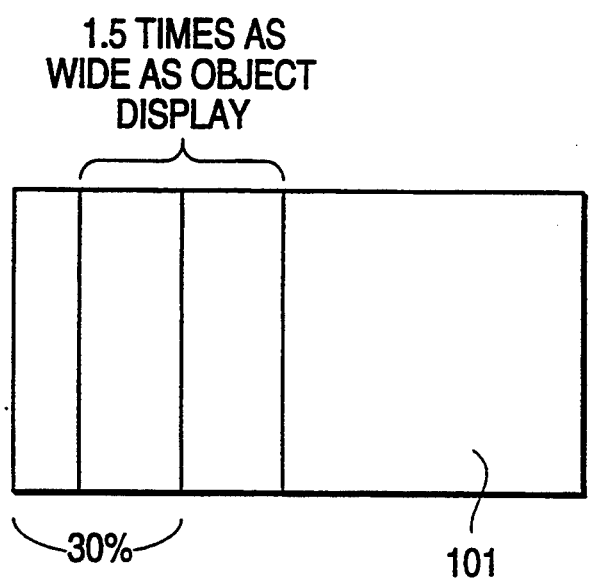
FIG. 15 is an illustration showing an example of a method for finding regions that cannot be used for object display in the embodiment.

The, regions that cannot be used to display the object depending on the conditions are found as follows: First, an example in which the condition is "A. fit to user position" is described. The user position is discern by inquiring of the user monitor section 154. For example, when the user monitor section 154 reports that the user's head is positioned at the 30% position from the left end of the desk, the regions that cannot be used to display the object are found as the hatched portions in FIG. 15. That is, if the region satisfying the condition A is defined as the region 1.5 times as wide as the object display, for example, with the user head as the center, other regions cannot be used for display of the object.

If the condition is "B. avoid obstacles on desk," the regions that cannot be used to display the object depending on the condition are discern by inquiring of the desk top monitor section 153. Since the desk top monitor section 153 holds the regions occupied by the obstacles on the desk as a set of rectangular regions, the set of the rectangular regions consists of regions that cannot be used for display of the object.

If this condition is "C. prevent display overlapping," the regions that cannot be used to display objects depending on the condition are discern by inquiring of the display content storage section 161. Since the display content storage section 161 stores the regions occupied by the displayed objects as a set of rectangular regions, the set of the rectangular regions consists of regions that cannot be used for new object display.

Thus, the regions that cannot be used to display the objects depending on the conditions can be found.

Up to now, we have discussed processing for displaying the object on the flat display 111. For processing in which the object is displayed on the upright display 121, the display position can also be determined by a similar method. However, the process for avoiding obstacles can be omitted because no obstacles would be placed on the display 121 which is upright.

Now, we will discuss methods for finding a visible (or easy-to-handle) position from the user position, avoiding obstacles on the desk, and determining whether the user uses the keyboard or pen input.

First, the method for finding the visible position from the user position will be described.

In the information processing system as in the embodiment, the display screen of the integral input and display unit has almost the same size as the top of a desk, and unlike the case in which the user views a conventional CRT display from a slightly distant position, a position at which it is difficult to the user to view the display may occur depending on the sitting position or body direction of the user. Therefore, to present an object to the user, the sitting position and body direction of the user are preferably considered to determine the display position. For example, when the user sits on a chair to the left side of a desk as shown in FIG. 6A, it is desired for the information processing system to present display at a position to the left on the flat display section 101, namely, the flat display 111 so that the user can easily see a document.

The conditions of the user are photographed by the camera 108, and are recognized by the image processor 413, namely, the image processing section 152 as described above. The recognition result is stored in the table 1541 (FIG. 11) in the user monitor section 154. Therefore, desired operation is enabled by the fact that when determining the display position of a document, the display position determination section 159 requests the user position from the user monitor section 154 for presenting display at a proper position in response to the request result.

For example, when the user monitor section 154 reports that the center of the user's head is placed at the 30% position from the left of the flat display section 101, if a document can be displayed so that the center of a page image of the document comes to the 30% position from the left of the flat display section 101 as shown in FIG. 6B, it can be estimated that the user easily sees it and performs input operations.

Next, the method for avoiding obstacles on the desk will be described.

As described above, in the information processing system as in the embodiment, the display 111 is integral with the desk 101 and may also be used as a normal work space on the desk. That is, the user may place the keyboard 105 and the mouse 106 on the desk for working and can place a notebook, dictionary, cup, etc., thereon.

Figure 7A:
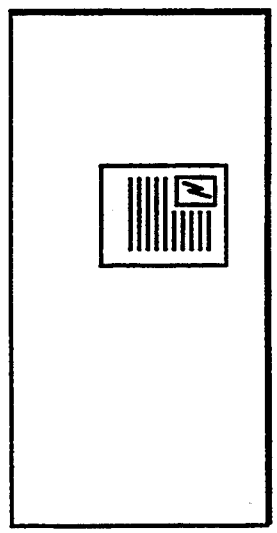
FIGS. 7A to 7D are illustrations showing an example of object display considering positions of obstacles on a desk in the embodiment.
Figure 7B:
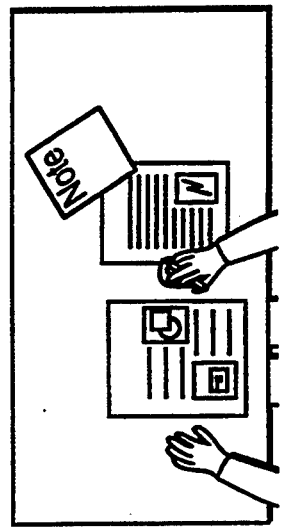
Figure 7C:
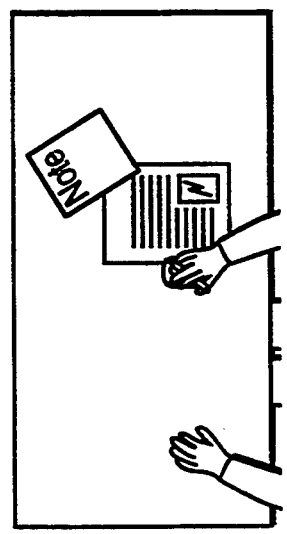

Therefore, to display an object on the flat display 111, display position is determined avoiding places hidden by the articles on the desk. For example, assume that when a new document in the icon state is to be opened, the situation viewed from above the desk 101 is as shown in FIG. 7A and that the flat display 111 displays the contents as shown in FIG. 7B. At this time, if only the object on the desk are extracted, the result is as shown in FIG. 7C. The picture as shown in FIG. 7C is provided by temporarily clearing the display contents of the display 111 conforming to the timing at which the camera picks up an image as described above. From the picture, the image processor 411, namely, the image processing section 151 can detect the area occupied by the object on the desk, and information thereon is stored in the desk top monitor section 153.

Figure 7D:
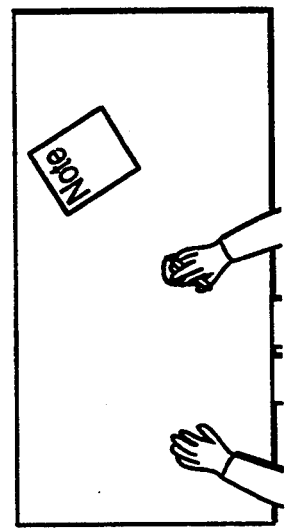

Therefore, desired operation is enabled by the fact that when determining the display position of a document, the display position determination section 159 requests the obstacle positions from the desk top monitor section 153 for presenting display at a proper position in response to the request result. As in the example in FIG. 7A, the page image of a new document may be opened at a place where the obstacle is avoided, as shown in FIG. 7D.

Next, the method for detecting the user attempting to use the keyboard is described.

Since the information processing system in the embodiment has a plurality of displays, it is necessary, in fact, to determine on which of the flat display 111 and the upright display 121 a picture is to be displayed. Since the camera 107 is located as means for monitoring the state of the desk top in the embodiment, the image, processing result of this picture can be used to determine on which display an object is to be displayed.

Figure 8A:
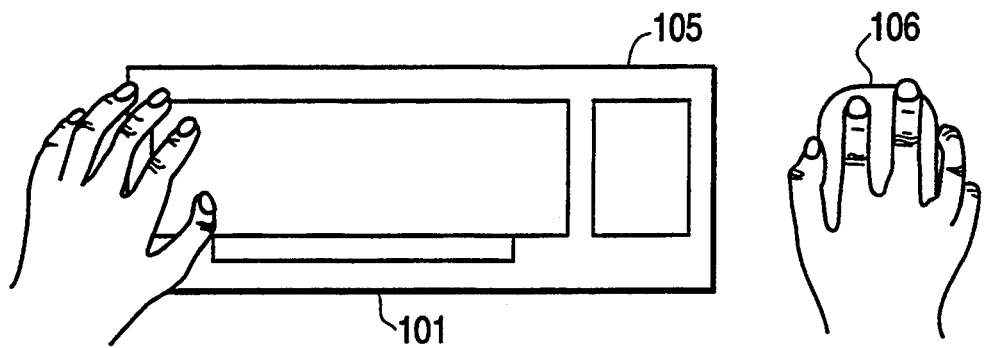
FIGS. 8A and 8B are illustrations showing a case where a user uses a keyboard in the embodiment.
Figure 8B:
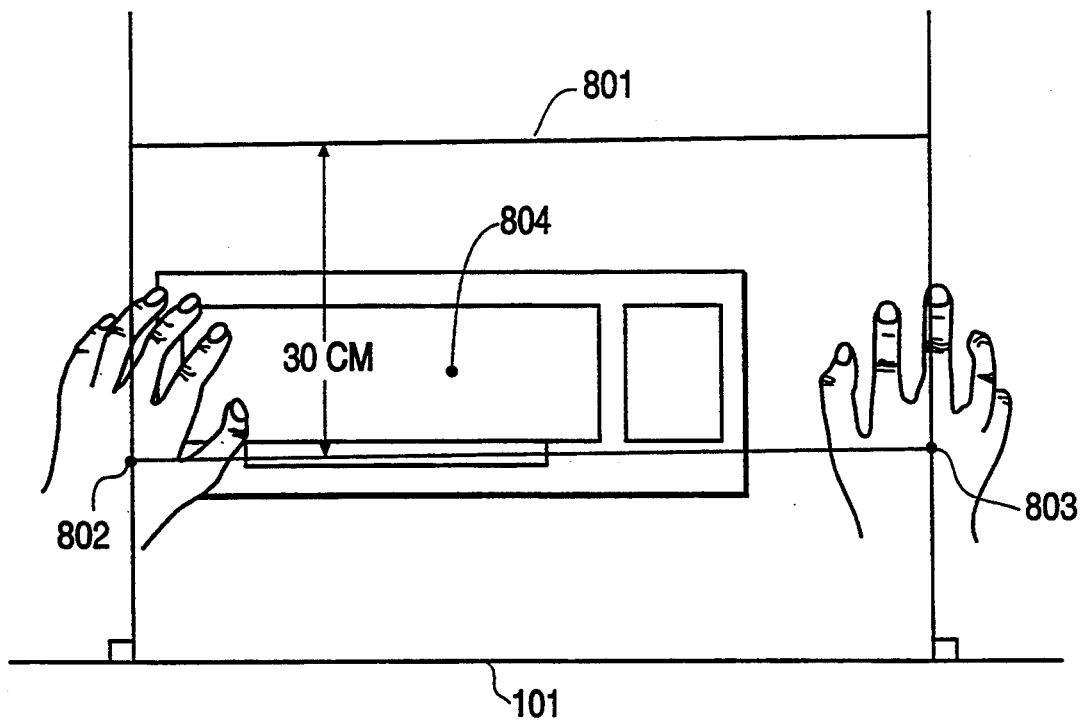

For example, when the information processing system displays the page image of a document, if image processing of a picture from the camera 107 indicates detection of obstacles on the desk and as a result, the relation between the user hands and the keyboard is as shown in FIG. 8A, it is possible that the user attempts to use the keyboard for handling the document. For example, the center-of-gravity positions of the hand pictures, 802 and 803, and the center-of-gravity position of the keyboard picture, 804, obtained as a result of the image processing are used for specific determination. When the keyboard center-of-gravity position 804 enters a polygon 801 indicated by the shaded portion in FIG. 8B for example, it is determined that the user uses the keyboard for working. The polygon 801 is an area surrounded by the side of the desk 101 toward the user, the line passing through the center of gravity of the picture of the left hand of the user, 802, and perpendicular to the side of the desk 101 toward the user, the line passing through the center of gravity of the picture of the right hand of the user, 803, and perpendicular to the side of the desk 101 toward the user, and the line 30 cm forward from the line connecting the center of gravity of the picture of the left hand of the user, 802, and the center of gravity of the picture of the right hand of the user, 803, for example. In FIG. 8B, the center-of-gravity position of the keyboard picture, 804, exists within the area of the polygon 801, thus it can be determined that the user attempts to use the keyboard for working.

The user attempting to use the keyboard 105 can be detected by the method as described above and information thereon is stored in the desk top monitor section 153. The information is used by the display position determination section 159 and as a result, the information processing system can judge that the page image of the document may be displayed on the upright display 121 to facilitate keyboard entry of the user.

Next, the method for detecting the user attempting to use pen input is described.

When the information processing system displays the page image of a document, if a picture from the camera 107 is processed by the image processing section 151 and obstacles on the desk are detected and as a result, the user picking up the pen 104 is detected as shown in FIG. 9A, it is possible that the user attempts to use pen input for handling the document. For example, the center-of-gravity position of the hand picture, 902, and the center-of-gravity position of the pen picture, 903, obtained as a result of the image processing are used for specific determination. When the center-of-gravity position 903 of the pen 104 enters a circle 901 indicated by the shaded portion in FIG. 9B for example, it is determined that the user uses the pen 104 for working. That is, the distance from the center-of—the center-of-gravity position 902 of the picture of hand that the pen 104 is taken in is, for example, 8 cm or less. In FIG. 9B, the center of gravity 903 of the picture of the pen 104 exists within the circle 901, thus it can be determined that the user attempts to use the pen 104 for working.

The user attempting to use the pen 104 can be detected by the method as described above and information thereon is stored in the desk top monitor section 153. The information is used by the display position determination section 159 and as a result, the information processing system can judge that the page image of the document may be displayed on the flat display 111 to facilitate pen input of the user.

Although the method of performing image processing of pictures from the camera is used as means for detecting the position and direction of the user in the embodiment, the conditions of the user may also be estimated by using means for detecting the relative position between the desk 101 or partition 102 and the chair 103. In an information processing system provided with means for inputting the position of the user head or hand information therefrom may also be used to estimate the conditions of the user. Such position input means is provided by attaching a small-sized magnetic field generator to the position measurement target and fixing a receiver to a desk or the like for measuring a magnetic field generated from the magnetic field generator for estimating the three-dimensional position and direction of the measurement target from a magnetic field change. A method of using an ultrasonic wave instead of the magnetic field is also proposed.

In the embodiment, the method of performing image processing of pictures from the camera photographing the desk top is used as means for detecting the user picking up the pen. However, similar operation can be performed if a function of detecting hand and pen coordinates with a technique other than image processing is provided. For example, the method of reading a magnetic field or ultrasonic wave change described above can be used.

In the embodiment, the method of performing image processing of pictures from the camera photographing the desk top is used as means for detecting that the keyboard is placed in front of the user. However, similar operation can be performed if a function of detecting the coordinates of the user's hand or body and the keyboard with a technique other than image processing is provided. For example, the method of reading a magnetic field or ultrasonic wave change described above can be used.

Up to now, we have mainly discussed optimum allocation of information presentation. Next, we will discuss direct handling of a document image 130 (or a display object) displayed on the flat display section 101 by hands of the operator with reference to FIGS. 17 to 26.

In the embodiment, hand motion and display object processing are previously related to each other as follows:

(1) Motion of holding a display object to be handled with one hand is related to layout processing of the entire display object and file processing of the display object. The layout processing refers to processing of a move, rotation, etc., of the display object. The file processing refers to processing such as storing document data corresponding to the display object in an auxiliary storage 410 (auxiliary memory) and transferring document data to an external network (LAN, FAX). Considering the fact that a move, rotation, etc., of an actual document is often performed with one hand, an operation environment in which the user does not feel a sense of incongruity can be provided by relating the motion of holding with one hand to layout processing and file processing as described above.

(2) Motion of holding a display object with both hands is related to page handling of the display object. The page handling refers to processing such as page turn, page-out/page-in of a specific page, page loosening, page alignment, and page replacement. Considering the fact that page turn and page loosening of an actual document on a desk are performed with both hands, an operation environment in which the user does not feel a sense of incongruity can be provided by relating them as described here.

(3) As hand motion, the following five types of motion are considered: (a) holding a display object, (b) releasing a display object, (c) move while holding, (d) rotation while holding, and (e) wave of thumb. (c) move while holding is related to a move of a display object,(d) rotation while holding is related to rotation of the entire display object and page turn amount or area, and (e) wave of thumb is related to page turn.

Such relating and processing performed by the CPU 403 described above provides a more advanced integrated man-machine interface using hands and a tablet (pen).

The operation of the information processing system provided by processing performed by the CPU 403 will be described before the contents of processing performed by the CPU 403 are discussed.

Figure 17A:
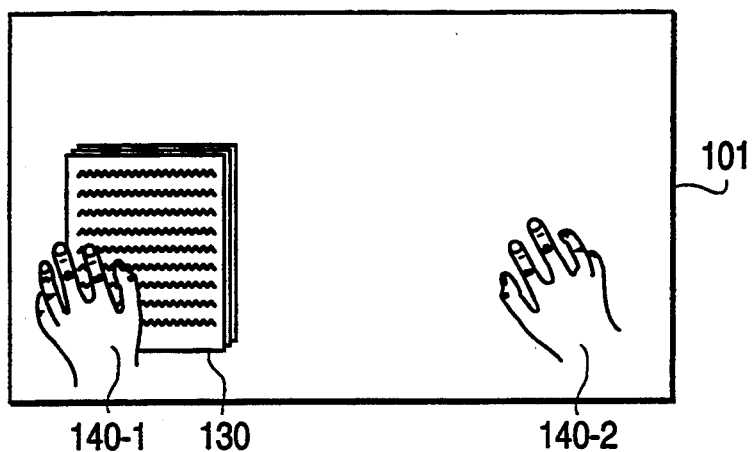
FIGS. 17A to 17C are illustrations of move operation and rotation operation of a display object in the embodiment of the invention.
Figure 17B:
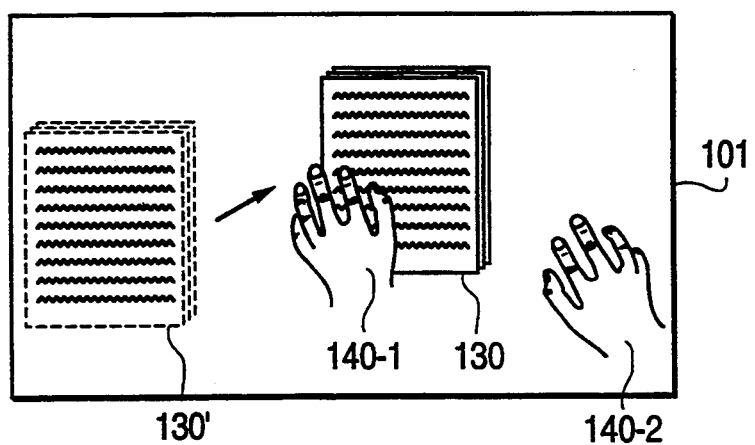
Figure 17C:
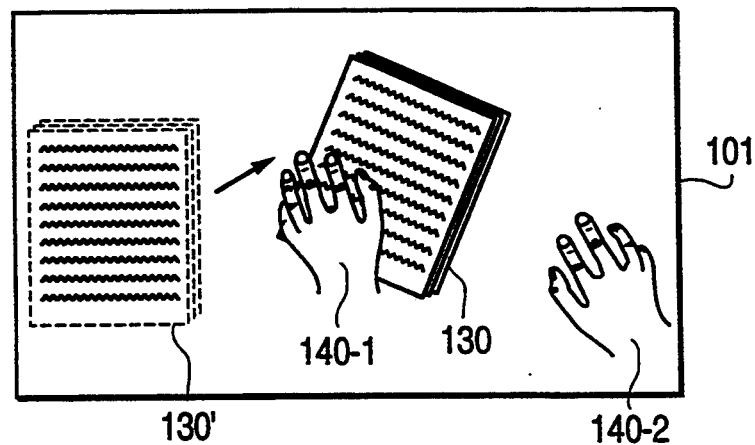

FIG. 17A to 17C are illustrations of move/rotation operations of a display object.

FIG. 17A represents a state in which a display object 130 is held with the left hand 140-1.

Whether or not the display object 130 is held can be determined by checking to see if the hand picture 140-1 exists in the area of the display object 130 and if the size of the hand picture substantially equals the previously learned hand size. That is, when the read hand picture size substantially equals the previously learned hand size, the object is judged to be held; when the former is larger than the latter, the object is judged to be released. The judgment is made by using the fact that when the hand approaches the overhead camera 107 from the desk top, the picture becomes dim and at the same time the hand image size becomes large.

In FIG. 17A, the right hand 140-2 is not used to hold the display object 130, thus the motion is judged to be a one-handed operation. If the left hand 140-1: is moved without rotation in this state, the entire display object is moved (130'→130) as shown in FIG. 17B according to the above-mentioned relating. On the other hand, if the wrist of the left hand 140-1 rotates as shown in FIG. 17C, the entire display object is rotated (130'→180) according to the above-mentioned relating.

Figure 18A:
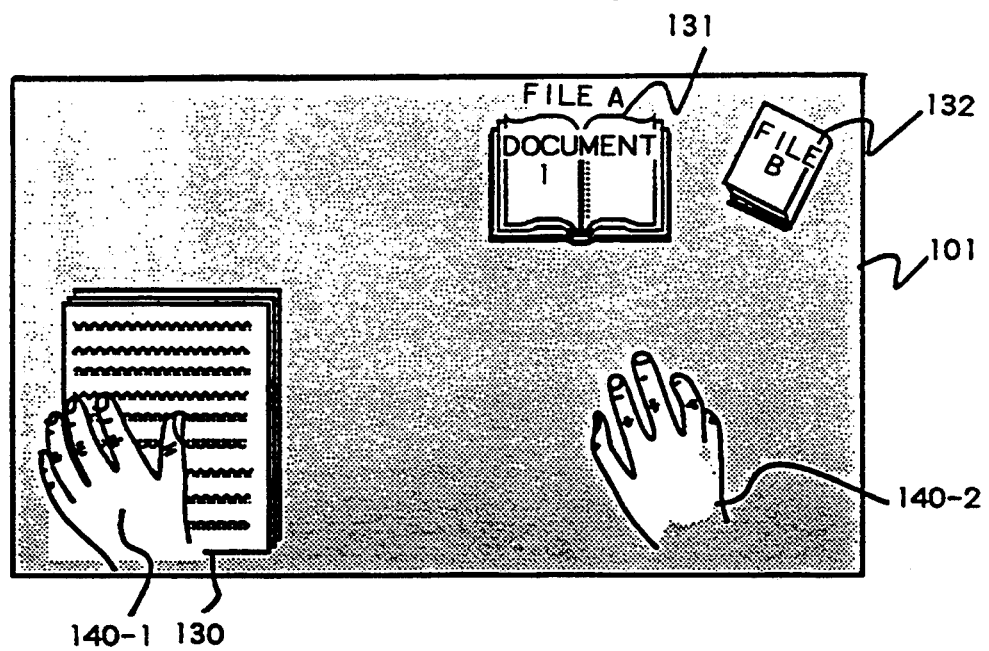
FIGS. 18A and 18B are illustrations of filing operation of a display object in the embodiment of the invention.
Figure 18B:
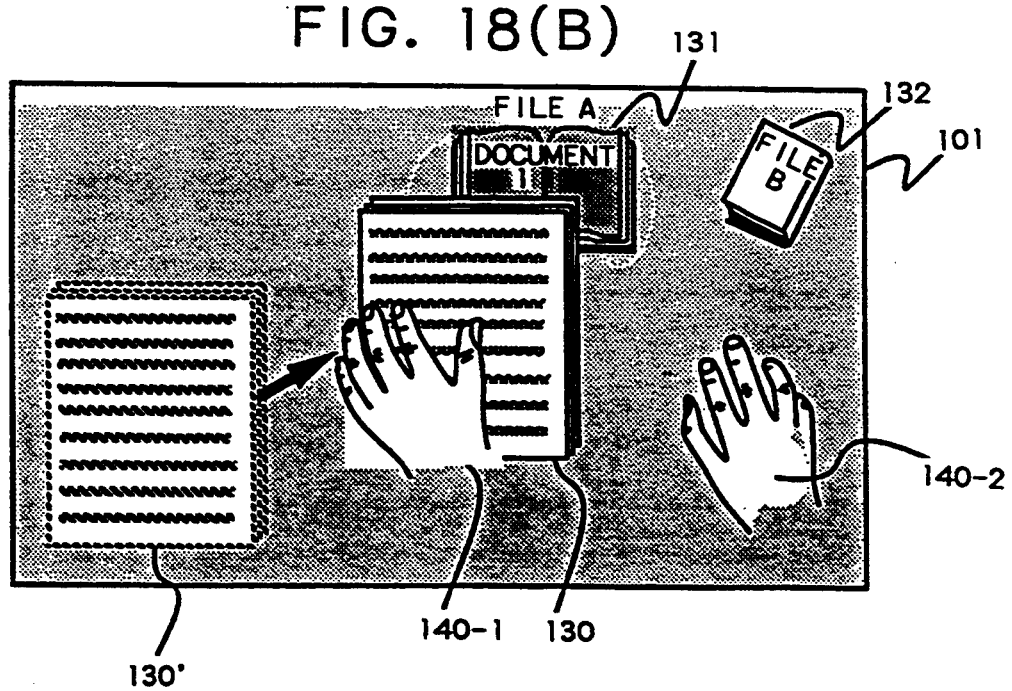

Next, FIGS. 18A and 18B are illustrations of filing operation of a display object.

The motion in FIG. 18A is also judged to be a one-handed operation as n FIG. 17A. Assume that icons of files A and B are previously displayed on the flat display section 101 and that necessary pages of file A are previously opened. The files are provided corresponding to the secondary storage 410 such as auxiliary memory and file input/output devices such as the FAX I/F 418 and the LAN I/F 417. Now, assume that the file A corresponds to the secondary storage 410 or a directory located on the secondary storage 410.

If the display object 130 is held and the hand is moved as shown in FIG. 18B, the object 130 is also moved (130'→130) according to the above-mentioned relating. However, if the display object 130 overlaps the file A, the display brightness of the file A changes and an acceptance action of file operation is displayed. Here, if the object is released, the processor 401 stores the document data corresponding to the display object 130 as a file in the secondary storage 401 or directory corresponding to the file A, and erases the display of the display object 130. After this, the stored document data file is displayed as one page of the file A.

Figure 19A:
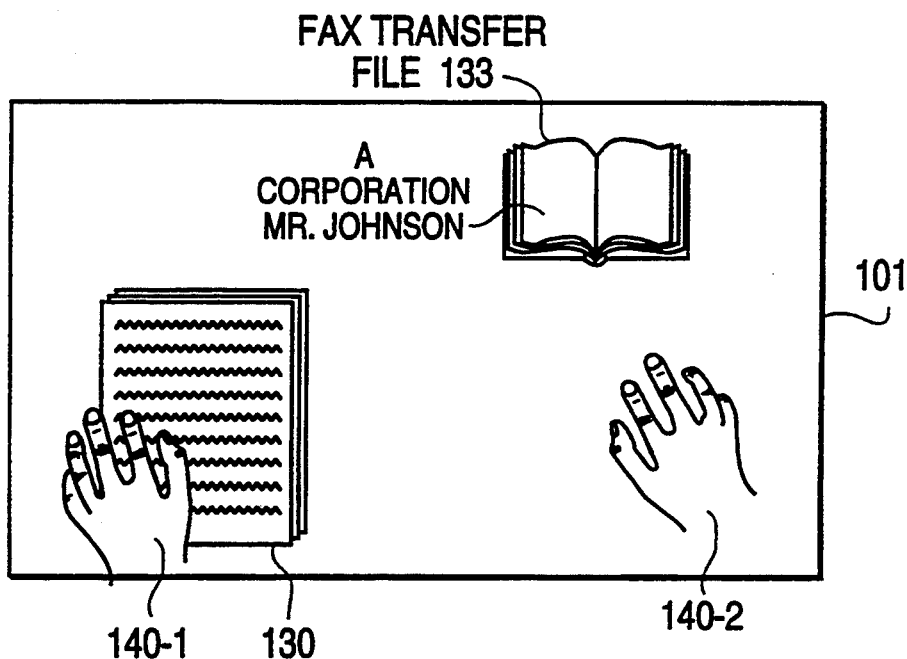
FIGS. 19A and 19B are illustrations of FAX transfer operation of a display, object in the embodiment of the invention.
Figure 19B:
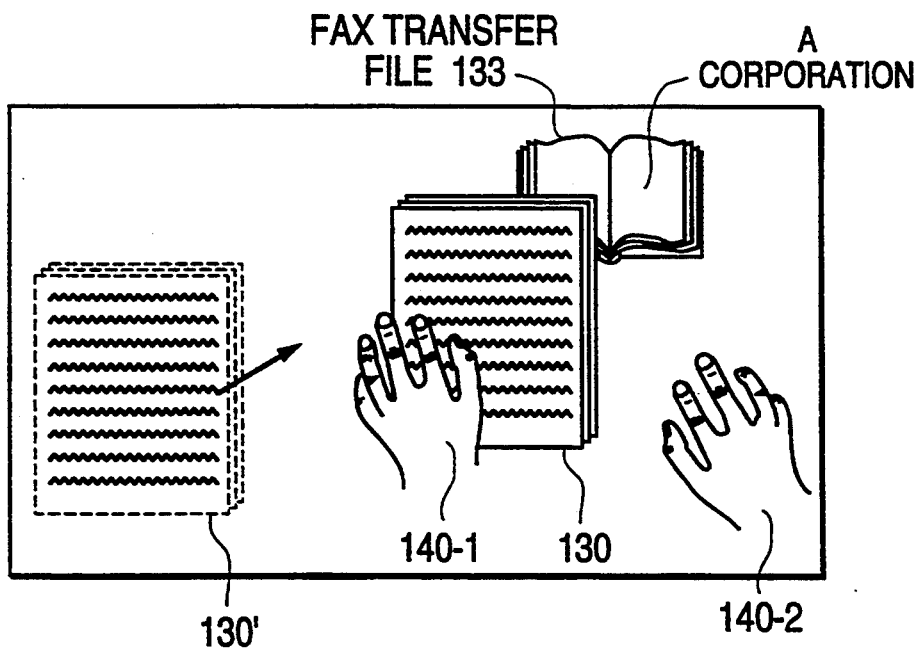
Figure 20A:
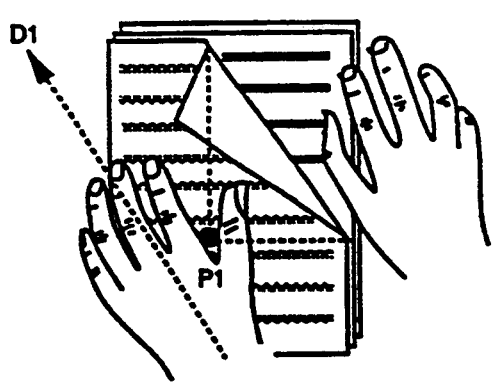
FIGS. 20A to 20D are illustrations of page turn operation for a display object in the embodiment of the invention.
Figure 20B:
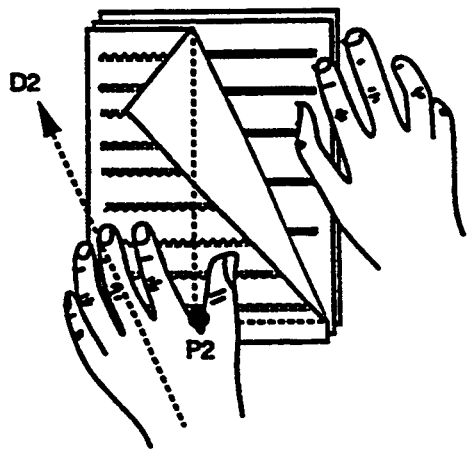
Figure 20C:
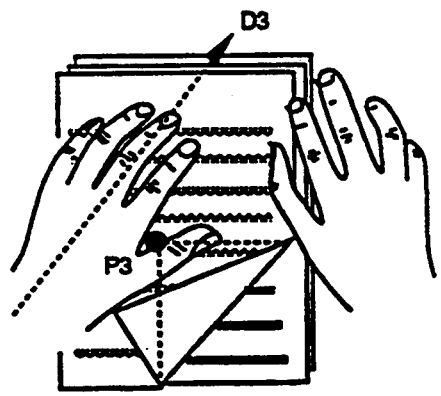
Figure 20D:
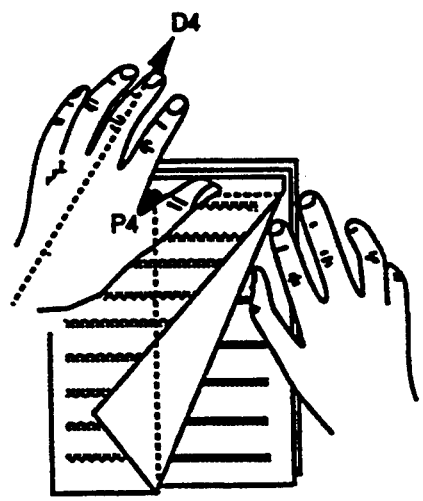

Next, FIGS. 19A and 19B are illustrations of a FAX transfer operation of a display object.

The motion in FIG. 19A is also judged to be a one—assume that a FAX transfer file previously exists on the flat display section 101 and that its destination is opened. In the FAX transfer file 133, the name and telephone number of an associated party that can be selected as a destination is stored for each page, and the destination can be selected by opening its corresponding page. In the example, A corporation, Mr. Johnson is the FAX destination.

If the object is moved to the FAX transfer file 133 as shown in FIG. 19B, as in FIG. 18B, the display brightness of the FAX transfer file 133 changes, informing the operator that the system is ready to accept a start command. Here, if the display object 130 is released, the destination telephone number is automatically dialed for transmitting the document file data corresponding to the display object 130.

FIGS. 20A to 20D show a page turn operation.

When a display object is held with both hands, it is judged to be a page handling motion according to the above—thumb while he or she, holds the display object with both hands, page turn is performed according to the above—when the document object consists of a plurality of pages, parts of other pages are turned in sequence according to the page arrangement with a part of one page turned.

As shown in FIGS. 20A to 20D, the turn place and turn amount or area are specified in response to the directions of the middle finger of the left hand, D1–D4, and hollow point coordinates between the thumb and forefinger of the left hand, P1–P4. Since the directions D1 and D2 are each upward left in FIGS. 20A and 20B, the turn place becomes an upper right portion. Moreover, as the hollow point coordinates approach the bottom, the turn area becomes larger. On the other hand, the directions D3 and D4 are each upward right in FIGS. 20C and 20D, and the turn place becomes a lower right portion. Thus, the turn place, and turn amount or area can be changed as desired in response to the direction D and the hollow point coordinates P.

Further, the page turn direction (forward or backward) is judged according to a wave of the thumb. In the embodiment, when a state in which the operator opens the thumb with respect to the forefinger continues for a predetermined time after the operator holds the object in hand, the subsequent thumb wave is assumed to be a forward direction. On the other hand, when a state in which the operator puts the thumb and forefinger together continues for a predetermined time, the subsequent thumb wave is assumed: to be a backward direction. When the operator waves the thumb in the backward direction, the pages turned in the forward direction are restored in sequence. To change the turn direction, if the operator stops the thumb wave and then holds the state in which the thumb opens with respect to the forefinger for a predetermined time, the subsequent wave changes to the forward direction; if the fingers are put together, the subsequent wave changes to the backward direction. The turn speed is proportional to the wave speed of the thumb.

The page turn operation is performed by the left hand in the example in FIGS. 20A–20D, but may be performed by the right hand. Which hand the page turn operation is performed by is judged according to how much the object holding hand rests on the object. The page turn place and turn amount or area may be determined according to the place (four corners) when the operator holds the display object with both hands. The page turn direction may be defined as the forward direction when the operator waves the thumb of the left hand and the backward direction when the operator waves the thumb of the right hand.

The page turn is reset when the operator releases his or her hold on the display object. That is, the pages are restored to the page unturned state.

Figure 21A:
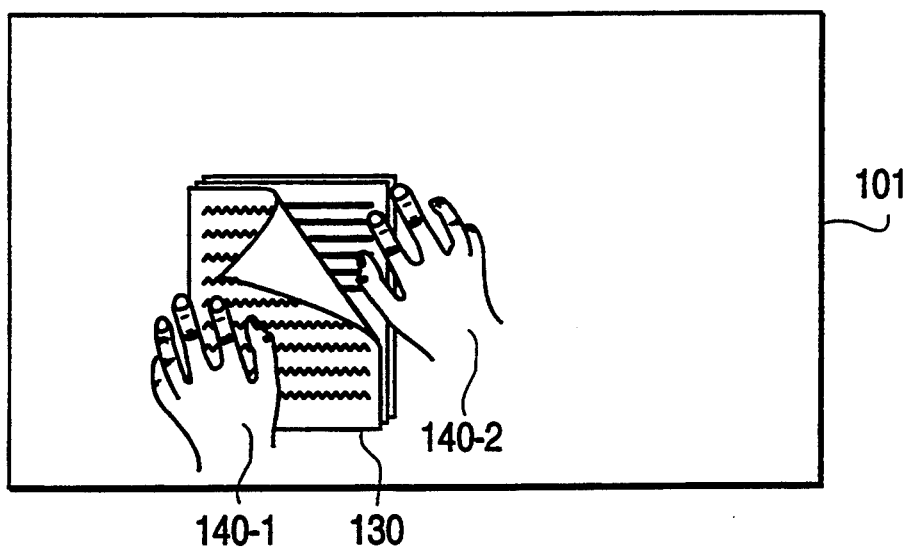
FIGS. 21A and 21B are illustrations of page-object in the embodiment of the invention.
Figure 21B:
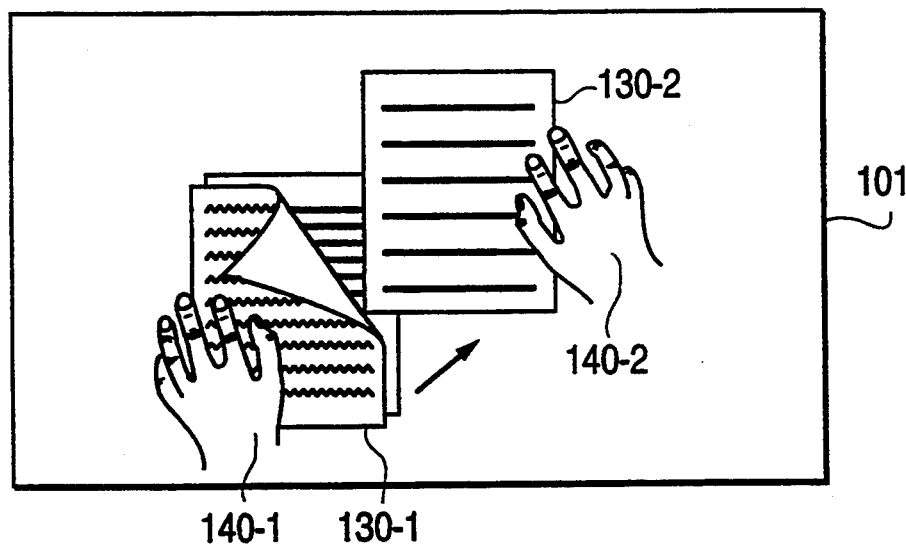

Next, FIGS. 21A and 21B show page-out/page-in operation.

The page-out/page-in operation is performed when the target page is found while pages are being turned. If the operator moves the one hand which is not used for the page turn operation so as to draw out the found page from the turn place as shown in FIG. 21B while turning the pages as shown in FIG. 21A, only this page is taken out for display (page-out). In contrast, if the operator returns the hand, the page is displayed at the former position (page-in).

Figure 22A:
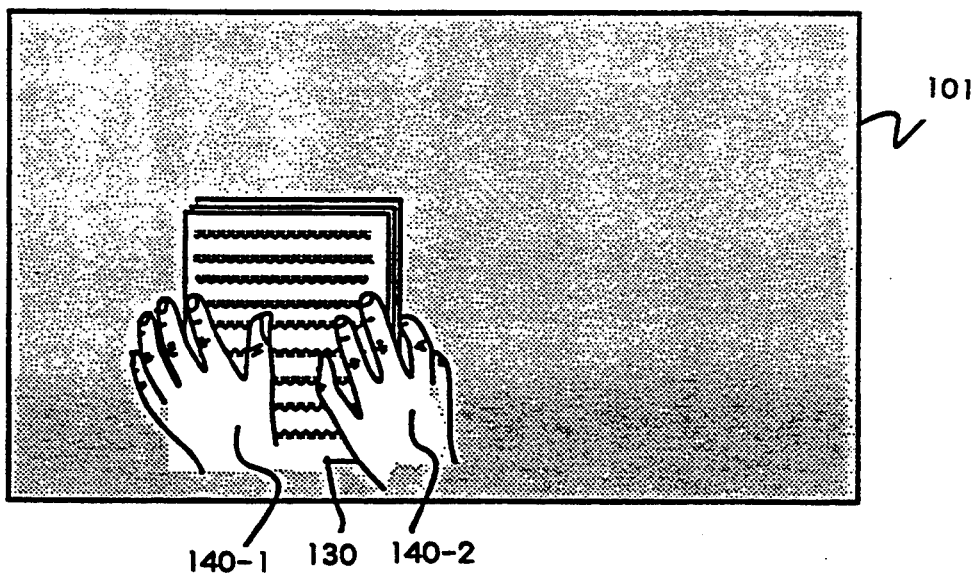
FIGS. 22A and 22B are illustrations of page loosening operation for a display object in the embodiment of the invention.
Figure 22B:
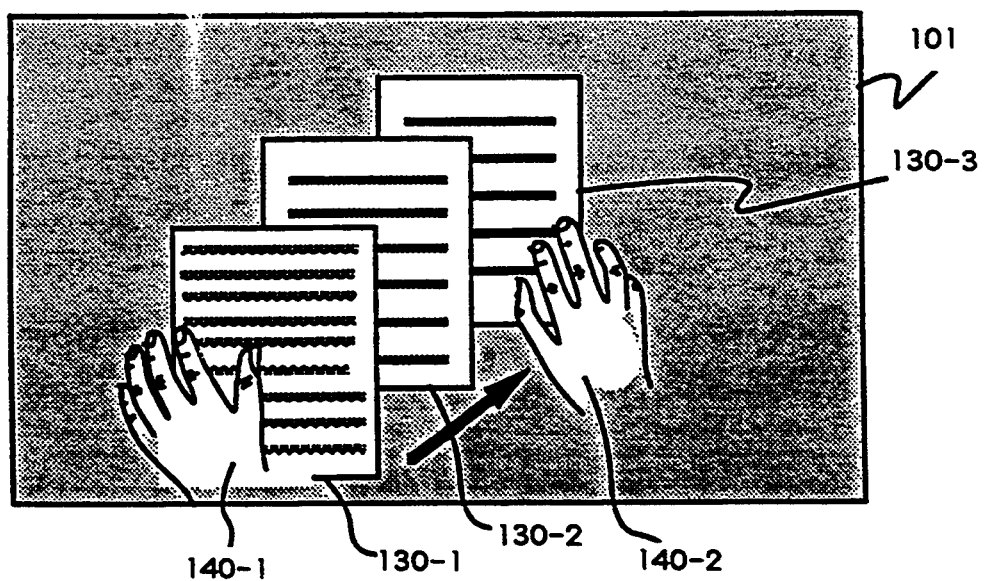

FIGS. 22A and 22B illustrate a page loosening operation.

The page loosening operation means that if the operator moves one of the hands holding the display object when pages are not turned, pages are loosened for display accordingly, as shown in FIGS. 22A and 22B. The distance between pages is determined by the move distance. That is, if the move distance is short, the pages greatly overlap each other; if the move distance is long, the pages overlap each other less and are loosened.

Figure 23A:
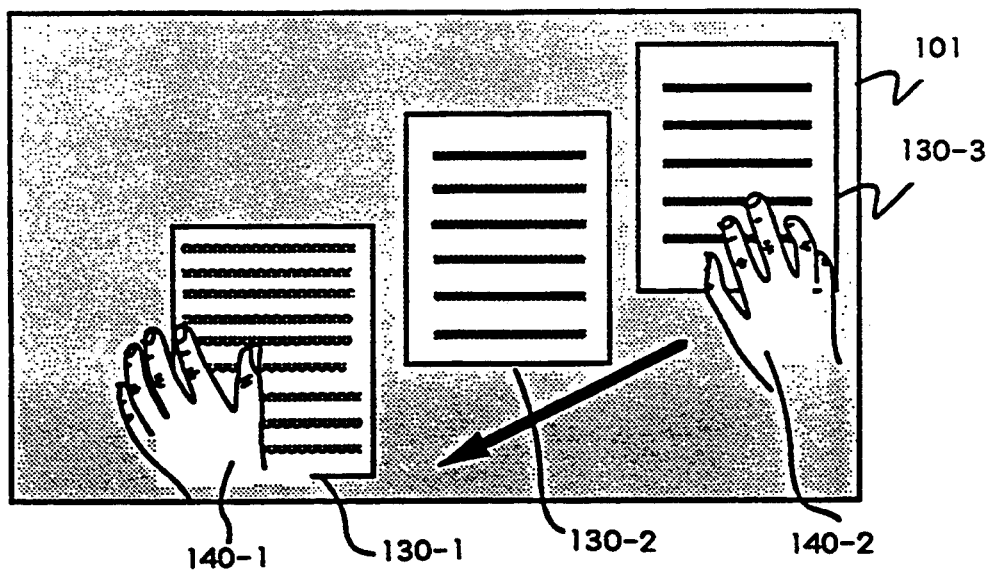
FIGS. 23A and 23B are illustrations of page gathering operation for a display object in the embodiment of the invention.
Figure 23B:
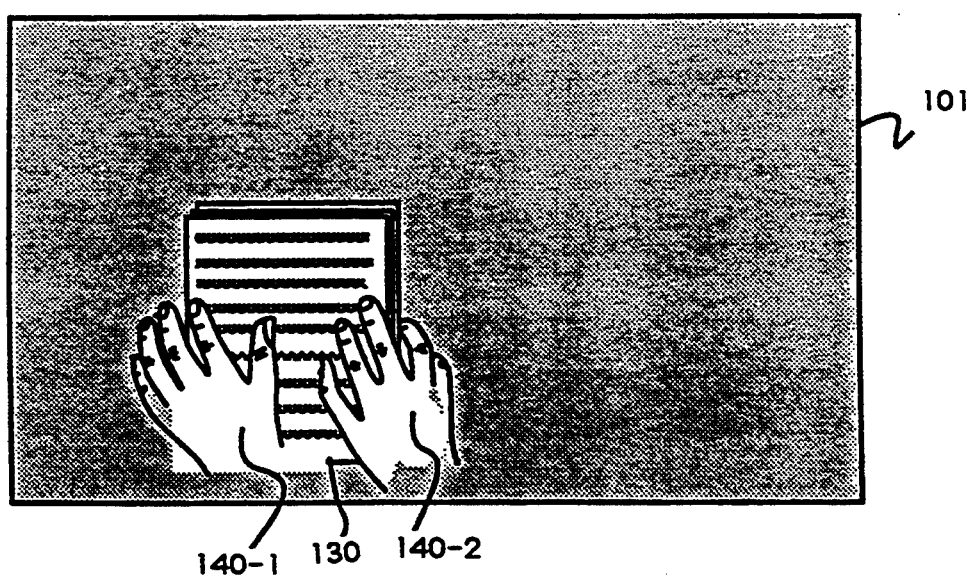

On the other hand, FIGS. 23A and 23B show a page gathering operation, which gathers loose pages.

Page replacement can be accomplished by temporarily taking out the target page using the page-out/page-in operation when pages are turned, turning to the insertion page, and inserting the target page in the place by page-out/page—pages and then accepting a move operation as described above for changing the arrangement or order of the pages.

Figure 24A:
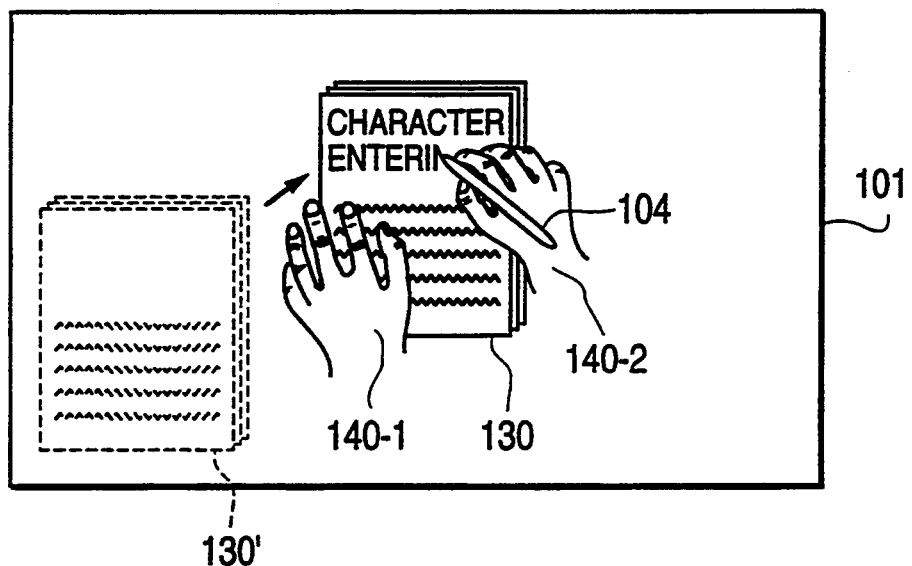
FIGS. 24A and 24B are illustrations of entering and editing characters in a display object in the embodiment of the invention.
Figure 24B:
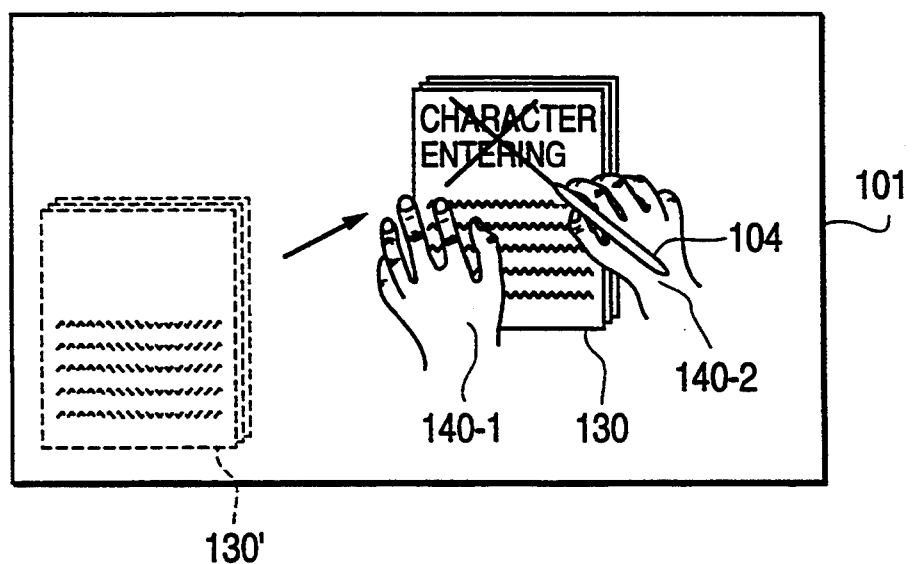

Next, we will discuss entering characters and graphics in a display object with the pen 104 in FIG. 1 and editing the entered characters and graphics with reference to FIGS. 24A and 24B.

FIG. 24A shows a situation in which after moving a display object (130'→130), the operator enters characters in the display object 130 with the pen 104. In FIG. 24A, the entered character string of up to "Character enterin" has been recognized and is displayed. On the other hand, entering the character "g" has not yet been completed, thus the character has not yet been recognized and the incomplete form of the character part is displayed. Upon completion of entering "g," character recognition is started and the character corresponding to the recognition result is displayed in place of the display of the incomplete character part. The code of the character corresponding to the recognition result is described at the corresponding position in the document data file in the memory 402. The entry end of each character is recognized by character cutout processing such as frame cutout or timeout cutout.

Next, to edit already entered characters or graphics, first the operator changes the mode of the pen 104 from input mode to edit mode, as shown in FIG. 24B. To change the mode, for example, a mode change menu may be displayed for the operator to specify a mode change with the pen or the mode may be changed in response to the relationship between the object to be edited and pen input stroke length or a dedicated switch to mode change may be located on the pen.

In the edit mode, if an edit gesture of an X mark, for example, is entered on the edited object (in this case, the character string "character entering"), the edit gesture is recognized and the display of the character string "character entering" is immediately erased, just like proofreading on paper with a red ink pen or the like. At this time, the corresponding code string of the character string "character entering" in the document data file in the memory 404 is also cleared.

In addition to characters, graphics can also be entered and edited in a similar manner.

By the way, when the display object is held with both hands, the transition is made to the page handling processing mode; however, when the user holds the pen 104 in his hand, the transition to the mode is preferably inhibited in order to enable the user to perform pen input operation with both hands as shown in FIGS. 24A and 24B. Such control is provided by monitoring hand motion of the user by a monitor camera for detecting the user holding the pen and inhibiting the transition to the page handling processing mode in response to the detection.

Now, we will discuss the contents of processing of the CPU 403 for enabling such operation.

First, hand motion recognition process 1000 performed in the image processing section 151 will be described.

In the process, hand motion is recognized from an image read into the memory 404 and operation commands and parameters are found in response to the recognition.

Figure 25:
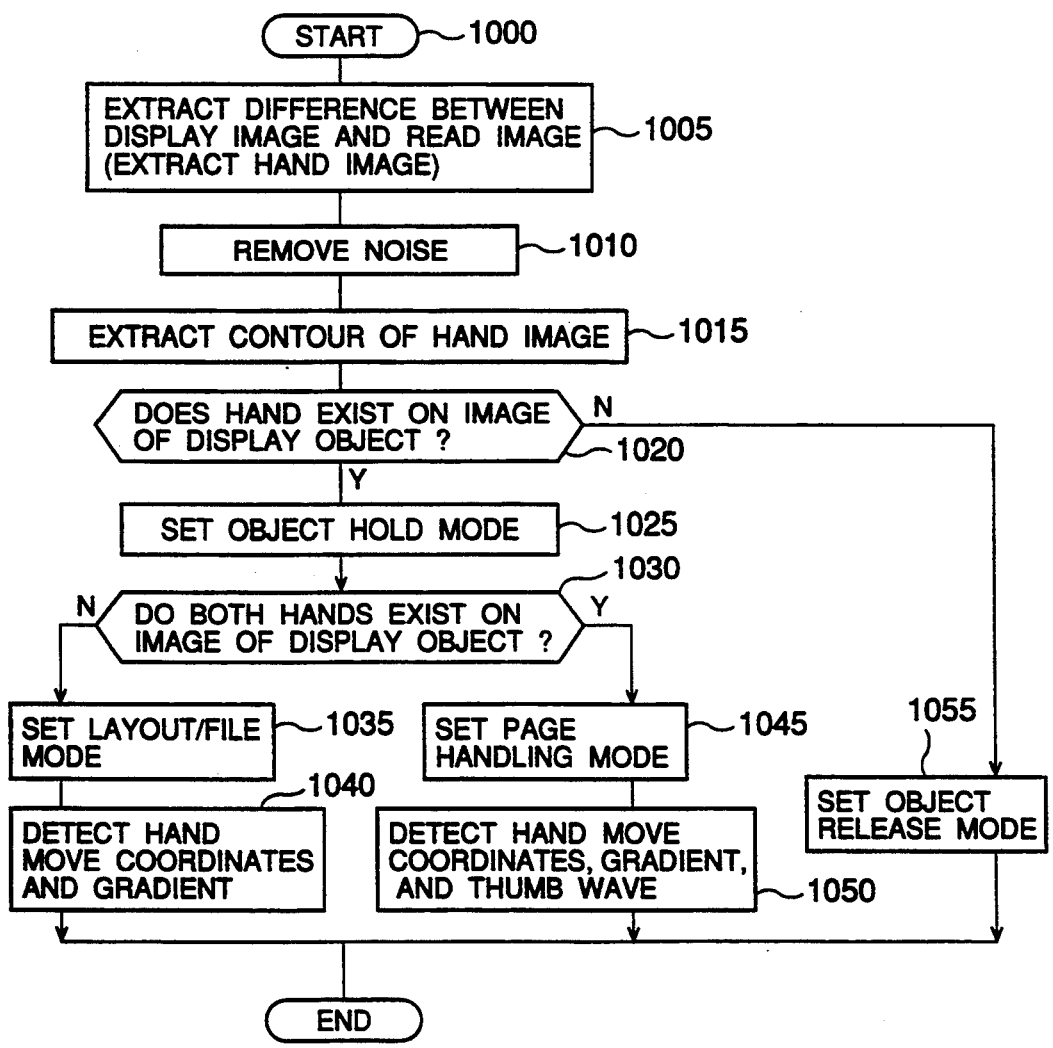
FIG. 25 is a flowchart showing the processing sequence of hand motion recognition process according to the embodiment of the invention.

FIG. 25 shows the processing sequence of the hand motion recognition process 1000.

As shown in FIG. 25, in the process, first the difference between a display image (display object) and an image read into the memory 412 by the image processing section 151 to extract only the hand image at step 1005.

Next, the difference image found at step 1005 is filtered to remove noise at step 1010. The filtering can be performed using a spatial filter widely used for the purpose.

Next, when the hand image can be extracted, the hand form is extracted at step 1015, thereby removing other objects than the hand on the flat display section 101. (The hand form is extracted and others are removed.) The hand position and hand move direction, gradient, etc., can be sensed from the found hand form. The hand form can be recognized by using techniques described in Non-contact Hand Form Recognition and Its Application by Izumi OKAMURA and Akira SUMIMOTO, "SHINGAKU GIHOU"FIC93-6 (1993-05), DENKI JOUHOU TUSHIN GAKKAI, for example.

Next, when the hand form can be recognized, whether or not the hand form size substantially equals the previously learned hand size is determined. If they are substantially equal, whether or not the hand position (on the flat display section 101) overlaps the display object is determined at step 1020. If the hand form size differs from the previously learned hand size or if the hand position does not overlap the display object, it is judged that the display object is released, and OBJECT RELEASE mode is set at step 1055. On the other hand, if the hand form size substantially equals the previously learned hand size and the hand position overlaps the display object, it is judged that the display object is held, and OBJECT HOLD mode is set at step 1025.

When the OBJECT HOLD mode is entered, whether or not the display object is held with both hands is then determined at step 1030. If it is judged that the display object is held with one hand, LAYOUT/FILE mode is set at step 1035. If the display object is held with both hands, PAGE HANDLING mode is set at step 1045.

On the other hand, when the LAYOUT/FILE mode is set, a change in the hand form is traced, and parameters of the object holding hand are calculated at step 1040. The coordinates after a move of the hand form and the gradient of the wrist, etc., are used as the parameters. The wrist gradient can be judged from the middle finger direction D shown in FIGS. 20A-20D.

When the PAGE HANDLING mode is set, a change in the hand form is traced, and parameters of both hands holding the object are calculated at step 1050. In addition to the parameters for one hand, the wave state of the thumb is detected. It can be found from a change in the relative position of the thumb tip to the palm.

Upon completion of setting the mode and calculating the parameters, the object handling process 1100 is performed.

The object handling process 1100 is described below.

Figure 26:
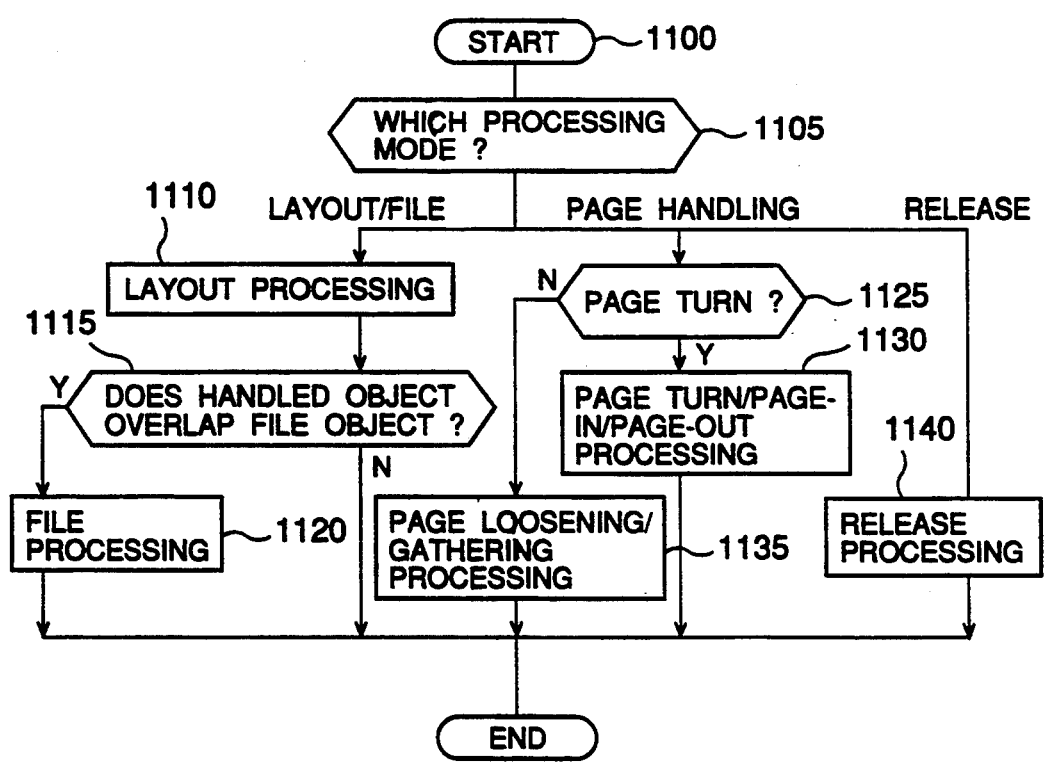
FIG. 26 is a flowchart showing the processing sequence of object handling process according to the embodiment of the invention.

FIG. 26 shows the processing sequence of the object handling process 1100.

In the process, first the mode set in the hand motion recognition process 1000 is judged LAYOUT/FILE, PAGE HANDLING, or RELEASE at step 1105.

When the mode is judged LAYOUT/FILE, layout processing is first performed at step 1110. When the move destination of the object overlaps the file or FAX display coordinate position at step 1115, file processing is performed at step 1120.

In the layout processing, move display and rotation display of the held display object are performed based on the move destination coordinates and gradient data of the hand form, as shown in FIGS. 17A—characters, graphics, etc., are rotated for display as if the paper were tilted. When the display object is moved or rotated in the layout processing, a friction sound, such as would be generated between a desk and paper may be artificially produced and output via the sound interface 415 from the loudspeaker 416, thereby raising the feeling of reality.

The file processing varies depending on whether the display that the display object overlaps represents the secondary storage 410 or an external communication device such as a facsimile machine. If it represents a directory on the secondary storage as shown in FIGS. 18A and 18B, the document data file corresponding to the display object is stored in the secondary storage 410 or the corresponding directory. If FAX is represented as shown in FIGS. 19A and 19B, the document data file corresponding to the display object is transmitted via the FAX I/F 18. If LAN is represented, the document data file is transmitted via the LAN I/F 417.

On the other hand, if the mode is judged PAGE HANDLING at step 1105, first whether or not a page turn operation is being performed is determined by checking to see if the operator waves his or her thumb at step 1125. If the page turn operation is being performed, page turn/page-out/page-in processing shown in FIGS. 20A to 20D, 21A and 21B is performed at step 1130.

If the page turn operation is not performed, page loosening/page gathering processing shown in FIGS. 22A and 22B, 23A and 23B is performed at step 1135. At this time, page loosening or gathering is performed in response to the relationship between a change in the coordinates of one moving hand and the coordinates of the other fixed hand. When the pages are turned, page turn sound may be artificially produced and output via the sound interface 415 from the loudspeaker 416, as with the layout processing.

Last, if the mode is judged RELEASE at step 1105, release processing is performed at step 1140. The release processing is performed when the operator releases his or her hold on the display object. For example, when release is executed during layout processing or when one hand is released during page handling for pen input, release processing is performed. In the release processing, the mode set in the hand motion recognition process 1000 is cleared and a wait is made until a new mode is set and parameters are calculated in the hand motion recognition process 1000.

Even if the operator places his or her hand on the display object during pen input, it is not judged that the object is held.

Up to now, we have discussed the information processing system according to one embodiment of the invention.

Although whether the operator takes or releases his or her hold of the display object is determined by comparing with the initially input hand image size, a pressure sensor may be attached to the panel face of the flat display for determining whether the operator takes or releases his or her hold in response to the sensing result of the sensor.

That is, the pressure sensor senses the operator placing his or her palm on the flat display. If the operator does not place his or her palm on the flat display, it is always judged that the release state is entered. Preferably, the pressure sensor is capable of sensing a plurality of points at the same time.

Instead of using the pressure sensor, the palm on the horizontal face on the flat display may be sensed by a camera or an optical sensor for determining whether the operator takes or releases his or her hold of the display object.

Although we have discussed storage in the secondary storage 410 and transmission with FAX, a printer server, file server, etc., connected to LAN may be made available by a similar technique. In this case, icons representing the devices are displayed on the flat display so that the user can use them.

Hand motion is monitored by the overhead camera in the embodiment. Instead, with overhead lighting installed, a camera may be located below the flat display (rear side), thereby monitoring a hand shadow picture for monitoring hand motion. This makes it possible to relieve psychological pressure exerted upon the user as a result of overhead camera monitoring.

Although the flat display is installed horizontally like a normal desk in the description, the display may be installed uprightly so that it can be used like a blackboard. This arrangement is useful for presentation, etc.

Thus, according to the embodiment of the invention, the display object displayed on the flat display and the operator hands are monitored by the overhead camera for recognizing hand motion and the display object can be handled in response to the recognition. Therefore, it can provide a man-machine interface which enables the user to manipulate document data as if he or she handled actual paper.

Since the handling modes of layout, file, and page handling are distinguished from each other depending on whether hand motion is one-handed or both-handed, the operator can easily master the operation method. Storing of document data in the secondary storage and transmission thereof are enabled simply by overlaying the display object on a necessary display. Likewise, page handling can also be easily performed by combining hand movement and rotation, and a finger wave.

Artificial sound effects can also be produced for raising the feeling reality when object handling.

Since the upright front display is provided in addition to the flat display installed horizontally, abstract pictures such as an organization chart and an office layout diagram and a notice board such as a schedule table and a list of business showings can be displayed on the front display for improving office work efficiency.

The pen input environment enables the user to easily enter characters and graphics as required. The user can also use gesture commands with the pen for easy editing.

What is claimed is:

1. An information processing system which displays an object on a display, comprising:
   an integral input and display unit comprising a display which enables an object to be selectively displayed at one of a plurality of positions in a display area and a tablet having an input face overlaid on a display face of said display, the input and display face being disposed substantially horizontally; and
   means, when an object is to be presented to a user in the display area of said display, for determining a display position of the object in response to at least one of a state of the user, a state of any article placed on the input and display face, and a display state of said display.

2. The information processing system as claimed in claim 1 wherein said display position determination means has means for detecting a position of the user relative to said integral input and display unit for determining a position near the detected user position as a display position presenting the object.

3. The information processing system as claimed in claim 2 wherein said user position detection means is made up of means for inputting an image of the user and means for processing an image inputted by said input means.

4. The information processing system as claimed in claim 1 wherein said display position determination means has means for detecting an article placed on the input and display face for determining the display position of the object so as to avoid a position of the articles detected by said article detection means.

5. The information processing system as claimed in claim 4 wherein said article detection means has
   means for inputting the input and display face;
   means for processing an image inputted by said input means; and
   display control means for temporarily stopping display of the object at a time when an image is inputted by said input means.

6. The information processing system as claimed in claim 1 wherein said display position determination means has means for storing display position information of an object displayed on the input and display face for determining the display position of that object so as to avoid the display position of the object stored in said position information storage means.

7. The information processing system as claimed in claim 1 wherein said display position determination means provides a plurality of decision conditions concerning the state of the user, the state of any article placed on the input and display face, and the display state of said display, assigns priority levels to said plurality of decision conditions and combinations thereof, and finds a position at which the object is to be displayed in sequence according to the priority levels.

8. The information processing system as claimed in claim 1 further comprising:
   an additional display device whose display screen is upright with respect to said integral input and display unit; and
   pen detection means for determining whether or not the user picks up a pen of said tablet,
   wherein said display position determination means displays the object on said integral input and display unit if it is recognized that the user picks up the pen based on a determination result of said pen detection means.

9. The information processing system as claimed in claim 1 further comprising:
   an additional display device whose display screen is upright with respect to said integral input and display unit; and
   keyboard position detection means for detecting a relative position between the user and a keyboard,
   wherein said display position determination means displays the object on said additional display device if it is recognized that the keyboard is placed in front of the user based on a detection result of said keyboard detection means.

10. An information processing system which displays an object on a display, comprising:
    an integral input and display unit comprising a display and a tablet having an input face overlaid on a display face of said display, the input and display face being disposed substantially horizontally;
    an additional display device whose display screen is upright with respect to said integral input and display unit;
    pen detection means for detecting the user picking up a pen of said tablet; and
    display position determination means, when an object is to be presented to the user, for displaying the object on said integral input and display unit if it is recognized that the user picks up the pen based on a detection result of said pen detection means.

11. An information processing system which displays an object on a display, comprising:
    an integral input and display unit comprising a display and a tablet having an input face overlaid on a display face of said display, the input and display face being disposed substantially horizontally;
    an additional display device whose display screen is upright with respect to said integral input and display unit;
    keyboard position detection means for detecting a relative position between the user and a keyboard; and
    display position determination means, when an object is to be presented to the user, for displaying the object on said additional display device if it is recognized that the keyboard is placed in front of the user based on a detection result of said keyboard detection means.

12. In an integral input and display unit comprising a display which enables an object to be selectively displayed at one of a plurality of positions in a display area and a tablet having an input face overlaid on a display face of said display, the input and display face being disposed substantially horizontally, a method of detecting an article placed on the display face when said display is used, said method comprising the steps of:
    temporarily stopping display of the object on said display when the display face top is inputted by an input device; and
    detecting the article placed on the display face based on an image inputted at a time when the object display is stopped.

13. An information processing system which displays an object on a display comprising:
    a display;
    a camera for taking a picture on a display face of said display; and a processor connected to said display and said camera, said processor comprising:
  means for displaying a document represented by document data to be processed on said display;
  means for recognizing a hand of an operator and a position and motion of the hand contained in the picture taken by said camera;
  means responsive to the recognized hand position for determining whether or not the operator hand is placed on a display position of the document on the display face of said display; and
  display operation means, if the operator hand is placed on the display position of the document, responsive to motion of the operator hand subsequently recognized for performing corresponding operation on the document on which the hand is placed.

14. The information processing system as claimed in claim 13 further comprising:
  means, if the operator hand is placed on the display position of the document, responsive to the recognized hand and hand position for determining whether the operator places one hand or both hands on the display position of the document,
  wherein if the operator hand is placed on the display position of the document, said display operation means is responsive to motion of the operator hand subsequently recognized and a determination as to whether the operator places one hand or both hands on the display position of the document for performing different operation on the display of the document on which the hand or hands are placed.

15. The information processing system as claimed in claim 14 further comprising:
  a tablet being laminated on the display face of said display for accepting coordinates entered by the operator,
  said processor further including:
    means, if the coordinates accepted by said tablet are a position corresponding to the display position of the document, responsive to a locus of the coordinates accepted by said tablet for recognizing the type of character or graphics drawn by the operator; and
    means for entering the character or graphics of the type recognized in the document displayed at the display position corresponding to the coordinates accepted by said tablet and updating the display of the document to display of the document in which the character or graphics of the type recognized is entered.

16. The information processing system as claimed in claim 13, wherein
  said document data provides a document having a plurality of pages; and
  said display operation means of said processor, if the operator places both hands on the display position of the document, is responsive to motion of the operator hands subsequently recognized for performing operation concerning display of pages of the document and, if the operator places one hand on the display position of the document, is responsive to motion of the operator hand subsequently recognized for performing operation on display of the entire document.

17. The information processing system as claimed in claim 13, wherein the processor further includes means for outputting sound effects defined according to the operation performed by said display operation means on display.

18. An information processing system which displays an object on a display, comprising:
  a display;
  a camera for taking a picture on a display face of said display; and
  a processor connected to said display and said camera, said processor including:
    means for displaying a document containing a plurality of pages represented by document data to be processed on said display;
    means for recognizing a hand of an operator and a position and motion of the hand contained in the picture taken by said camera;
    means responsive to the recognized hand position for determining whether or not the operator hand is placed on a display position of the document on the display face of said display; and
    display operation means, when the operator hand is placed on the display position of the document, for displaying a part or all of each of the pages of the document on which the operator hand is placed in sequence on said display if motion of the operator hand subsequently recognized is a wave of a thumb of the operator.

19. The information processing system as claimed in claim 18 wherein the processor further includes means for outputting sound effects defined according to the operation performed by said display operation means on display.

* * * * *